United States Patent
Kato et al.

(10) Patent No.: US 7,136,100 B1
(45) Date of Patent: Nov. 14, 2006

(54) ELECTRONIC STILL CAMERA CAPABLE OF REMOVING NOISE COMPONENT IN IMAGE DATA AND SIGNAL PROCESSING METHOD THEREOF

(75) Inventors: Yoshiyuki Kato, Higashiyamato (JP); Masami Yuyama, Ome (JP); Noriyasu Murata, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 753 days.

(21) Appl. No.: 09/639,922

(22) Filed: Aug. 16, 2000

(30) Foreign Application Priority Data

Sep. 8, 1999  (JP)  .................................. 11-253970

(51) Int. Cl.
*H04N 5/217* (2006.01)
(52) U.S. Cl. ...................................... 348/241; 348/243
(58) Field of Classification Search ................ 348/241, 348/362–367, 221.1, 296, 243, 244
See application file for complete search history.

(56) References Cited

U.S. PATENT DOCUMENTS

| | | | |
|---|---|---|---|
| 5,293,239 A | | 3/1994 | Takahashi et al. |
| 5,812,703 A | | 9/1998 | Juen et al. |
| 5,926,214 A | * | 7/1999 | Denyer et al. ............... 348/241 |
| 6,101,287 A | * | 8/2000 | Corum et al. ................ 382/274 |
| 6,429,895 B1 | * | 8/2002 | Onuki .................... 348/208.99 |
| 6,486,915 B1 | * | 11/2002 | Bell et al. ..................... 348/362 |
| 6,614,562 B1 | * | 9/2003 | Minemier .................... 358/483 |
| 6,618,090 B1 | * | 9/2003 | Kidono et al. .............. 348/362 |
| 2002/0024605 A1 | * | 2/2002 | Merrill et al. .............. 348/243 |

FOREIGN PATENT DOCUMENTS

| | | |
|---|---|---|
| EP | 0 729 270 A2 | 8/1996 |
| JP | 4-40763 A | 2/1992 |
| JP | 08-051571 | 2/1996 |
| JP | 8-265654 A | 10/1996 |
| JP | 09-181977 | 7/1997 |
| JP | 10-83010 A | 3/1998 |
| JP | 10-208016 A | 8/1998 |

* cited by examiner

*Primary Examiner*—Vivek Srivastava
*Assistant Examiner*—Yogesh Aggarwal
(74) *Attorney, Agent, or Firm*—Frishauf, Holtz, Goodman & Chick, P.C.

(57) ABSTRACT

Upon depression of a shutter key of a key input unit, a sensed image (DATA1) is captured by exposing a CCD for exposure time T1 with a mechanical shutter opened, and a dark frame image (DATA2) is captured by exposing the CCD for exposure time Ta with the mechanical shutter closed. A correction value corresponding to exposure time T1 is then determined by looking up a correction data table stored in a storage area of a data memory, and DATA2 is corrected using the determined correction value. By subtracting the corrected DATA2 from DATA1, a dark output component contained in DATA1 is removed.

29 Claims, 18 Drawing Sheets

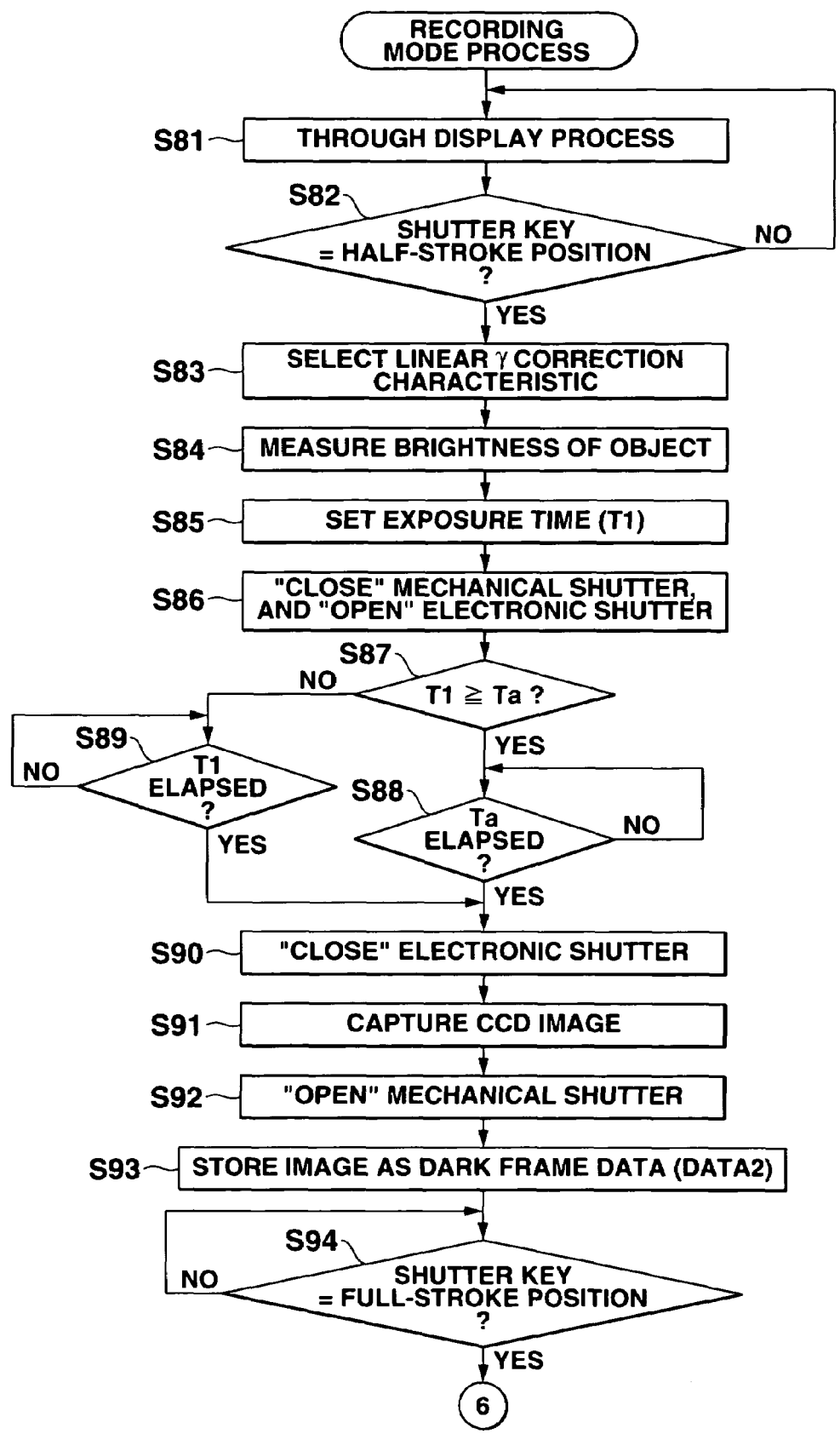

ELECTRONIC STILL CAMERA CAPABLE OF REMOVING NOISE COMPONENT IN IMAGE DATA AND SIGNAL PROCESSING METHOD THEREOF

CROSS-REFERENCE TO RELATED APPLICATIONS

This application is based upon and claims the benefit of priority from the prior Japanese Patent Application No. 11-253970, filed Sep. 8, 1999, the entire contents of which are incorporated herein by reference.

BACKGROUND OF THE INVENTION

The present invention relates to an electronic still camera and its signal processing method and, more particularly, to an electronic still camera which removes dark output components resulting from an image sensing element such as a CCD (Charge Coupled Device) or the like, and its signal processing method.

In recent years, electronic still cameras have rapidly prevailed. Such electronic still camera generates a still image of an object using an image sensing element such as a CCD or the like, and electronically records the generated image in a storage medium such as a semiconductor memory or the like.

An image sensing element such as a CCD or the like which is used in such electronic still camera has so-called dark output (dark voltage) characteristics; it produces an output even when incoming light is shielded, thus producing a very weak current called a dark current.

The dark voltage in the CCD becomes a noise component, and consequently adversely influences image data, thus deteriorating image quality.

As one method of solving this problem, when image sensing is instructed by shutter operation, it is done twice at an identical shutter speed (identical exposure time) with a mechanical shutter opened and closed and, after that, second image data (image data consisting of only dark output components) obtained by image sensing with the mechanical shutter closed is subtracted from first image data (object image data containing dark output components) obtained by image sensing with the mechanical shutter opened, thus removing the noise components from the first image data as sensed image data.

With this method, image quality can be prevented from deteriorating, and high-quality image data can be obtained.

Since the dark voltage (dark output components) in the CCD has temperature dependence (the dark voltage roughly doubles upon a change (increase) in ambient temperature of around 8° C.), and exposure time (charge accumulation period) dependence (the dark current tends to increase as the exposure time becomes longer), two image sensing operations are done at substantially the same timings (the same temperature) and the same exposure time to equalize the levels of the dark output components contained in the first image data and the second image data (dark output components).

However, such method can prevent image quality from deteriorating and can obtain high-quality image data, but requires two image sensing operations upon instruction of image sensing. For this reason, the time required for image sensing doubles if no other conditions are considered, and disturbs continuous image sensing.

This problem becomes more serious when image sensing must be done in a dark place, since a long exposure time must be assured.

It is an object of the present invention to provide an electronic still camera which can obtain high-quality image data while preventing deterioration of image quality, and can shorten the time required for image sensing, and its signal processing method.

BRIEF SUMMARY OF THE INVENTION

In order to achieve the above object, according to one preferred aspect, since an electronic still camera comprises image sensing means (image sensing element) for accumulating a charge corresponding to incoming light, converting the accumulated charge into image data, and outputting the image data, optical path opening/closing means (optical path opening/closing member) for opening/closing an incoming optical path to the image sensing means (image sensing element), image sensing instruction means (image sensing instruction member) for instructing image sensing, first image sensing control means for, when image sensing is instructed by the image sensing instruction means (image sensing instruction member), capturing first image data by exposing the image sensing means (image sensing element) for a first exposure time with the optical path opening/closing means (optical path opening/closing member) opened, second image sensing control means for, when image sensing is instructed by the image sensing instruction means (image sensing instruction member), capturing second image data by exposing the image sensing means (image sensing element) for a second exposure time shorter than the first exposure time with the optical path opening/closing means (optical path opening/closing member) closed, first correction means for correcting the second image data captured by the second image sensing control means, and second correction means for correcting the first image data captured by the first image sensing control means using the second image data corrected by the first correction means, an electronic still camera which can obtain high-quality image data while preventing deterioration of image quality and can shorten the time required for image sensing can be provided.

In another preferred aspect, since an electronic still camera comprises an image sensing element for accumulating a charge corresponding to incoming light, converting the accumulated charge into image data, and outputting the image data, an optical path opening/closing member for opening/closing an incoming optical path to the image sensing element, an image sensing instruction member for instructing image sensing, first image sensing control means for capturing first image data output from the image sensing element with the optical path opening/closing member closed in response to a first switch operation of the image sensing instruction means, second image sensing control means for capturing second image data output from the image sensing element with the optical path opening/closing member opened in response to a second switch operation of the image sensing instruction means, and image correction means for correcting the second image data captured by the second image sensing control means using the first image data captured by the first image sensing control means, an electronic still camera which can obtain high-quality image data while preventing deterioration of image quality and can shorten the time required for image sensing can be provided.

In still another preferred aspect, since there is provided a signal processing method for an electronic still camera for removing a noise component in image data output from an image sensing element, comprising the steps of: capturing first image data by exposing the image sensing element for a first exposure time with an incoming optical path to the image sensing element opened, when image sensing is instructed; capturing second image data by exposing the image sensing element for a second exposure time shorter than the first exposure time with the incoming optical path to the image sensing element closed, when image sensing is instructed; correcting the captured second image data; and correcting the captured first image data using the corrected second image data, high-quality image data can be obtained while preventing deterioration of image quality and the time required for image sensing can be shortened.

In still another preferred aspect, since there is provided a signal processing method for an electronic still camera for removing a noise component in image data output from an image sensing element, comprising the steps of: capturing first image data output from the image sensing element with an incoming optical path to the image sensing element closed, in response to a first switch operation of an image sensing instruction member; capturing second image data output from the image sensing element with the incoming optical path to the image sensing element opened, in response to a second switch operation of the image sensing instruction member; and correcting the captured second image data using the captured first image data, high-quality image data can be obtained while preventing deterioration of image quality and the time required for image sensing can be shortened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 17 is a flow chart (1/2) showing the operation of still another control program of the recording mode process shown in FIG. 7;

DETAILED DESCRIPTION OF THE INVENTION

The preferred embodiments of the present invention will be described hereinafter with reference to the accompanying drawing, taking a digital camera as an example.

Figure 1:
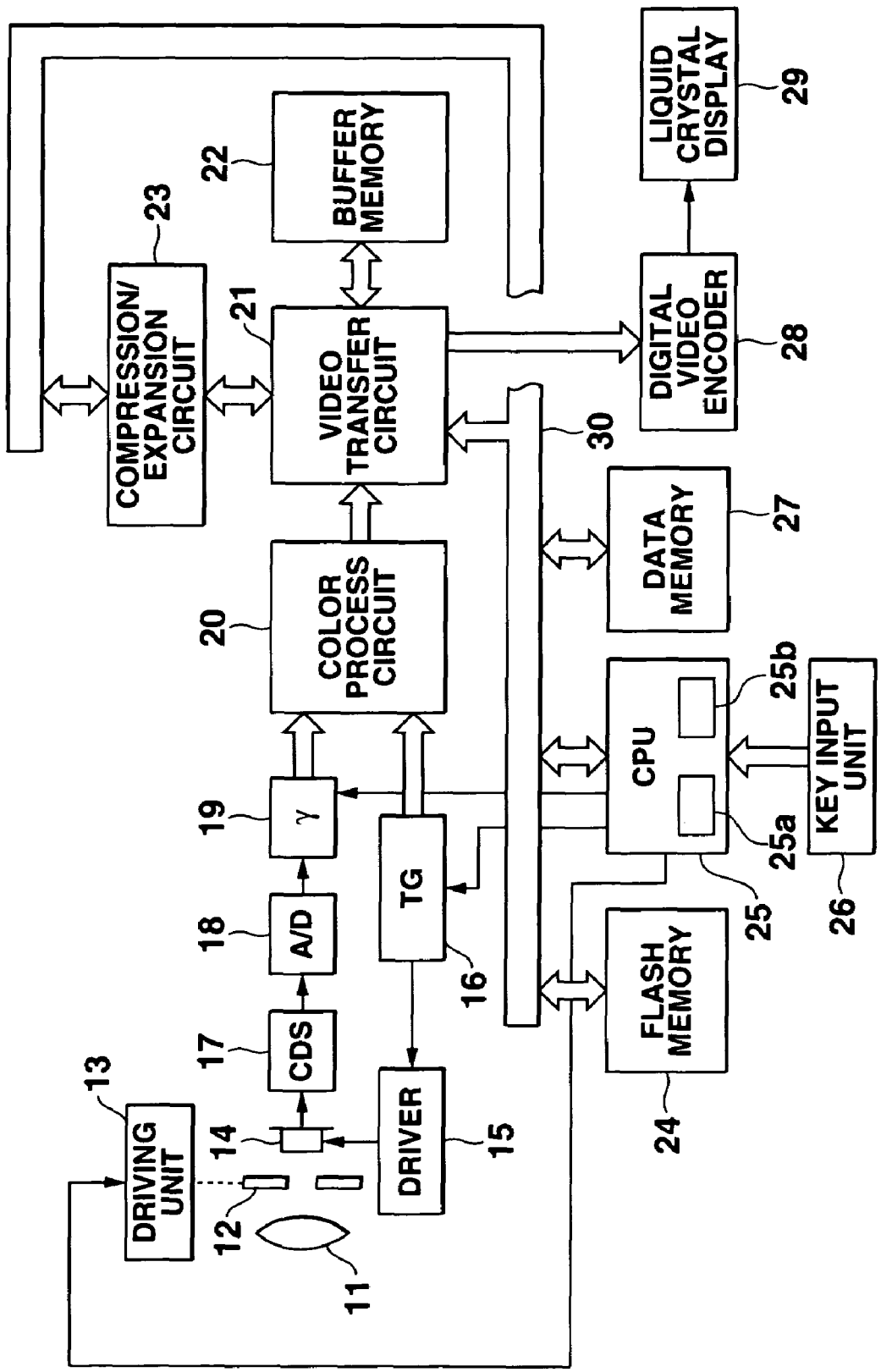
FIG. 1 is a schematic block diagram showing the arrangement of an electronic still camera according to the present invention.

Referring to FIG. 1, reference numeral 11 denotes a photo lens; 12, a mechanical shutter which is provided on the optical axis of the photo lens 11 and also serves as a stop mechanism; 13, a driving unit for adjusting the degree of opening of the mechanical shutter 12; 14, a CCD for receiving light that has passed through the mechanical shutter 12, and outputting a sensed image signal of an object; 15, a driver for the CCD 14; 16, a timing generator for generating various timing signals such as a signal for controlling the charge accumulation time (to be referred to an electronic shutter time hereinafter) of the CCD 14 and the like; 17, a correlative double sampling circuit (CDS) for sampling the sensed image signal output from the CCD 14 and removing noise; 18, an analog-to-digital converter (A/D) for converting the sensed image signal after noise removal into a digital signal; and 19, a gamma correction circuit.

Reference numeral 20 denotes a color process circuit for generating a luminance/color difference mixed signal (to be referred to as a YUV signal hereinafter) using the output from the gamma correction circuit 19; 21, a video transfer circuit for arbitrating the flow of signals; 22, a buffer memory for temporarily holding the YUV signal; 23, a compression/expansion circuit for compressing/expanding the YUV signal by a predetermined coding scheme (generally, JPEG (Joint Photographic Experts Group)) upon recording and playback; and 24, a fixed or detachable flash memory for recording the compressed YUV signal.

Reference numeral 25 denotes a CPU (Central Processing Unit) for making various kinds of control required upon recording and playing back an image by loading a control program stored in a program ROM (Read Only Memory) 25a onto a user work RAM (Random Access Memory) 25b and executing the loaded program; and 26, a key input unit for generating a key input signal in response to operation of a shutter button or various function buttons.

Reference numeral 27 denotes a data memory in which a correction data table (to be described later) is written in advance upon, e.g., delivery from a factory; 28, a digital video encoder for converting the YUV signal held in the buffer memory 22 into a signal format suitable for display; 29, a liquid crystal display for image monitor, which displays a signal output from the digital video encoder 28; and 30, a bus for connecting the respective units.

Figure 2:
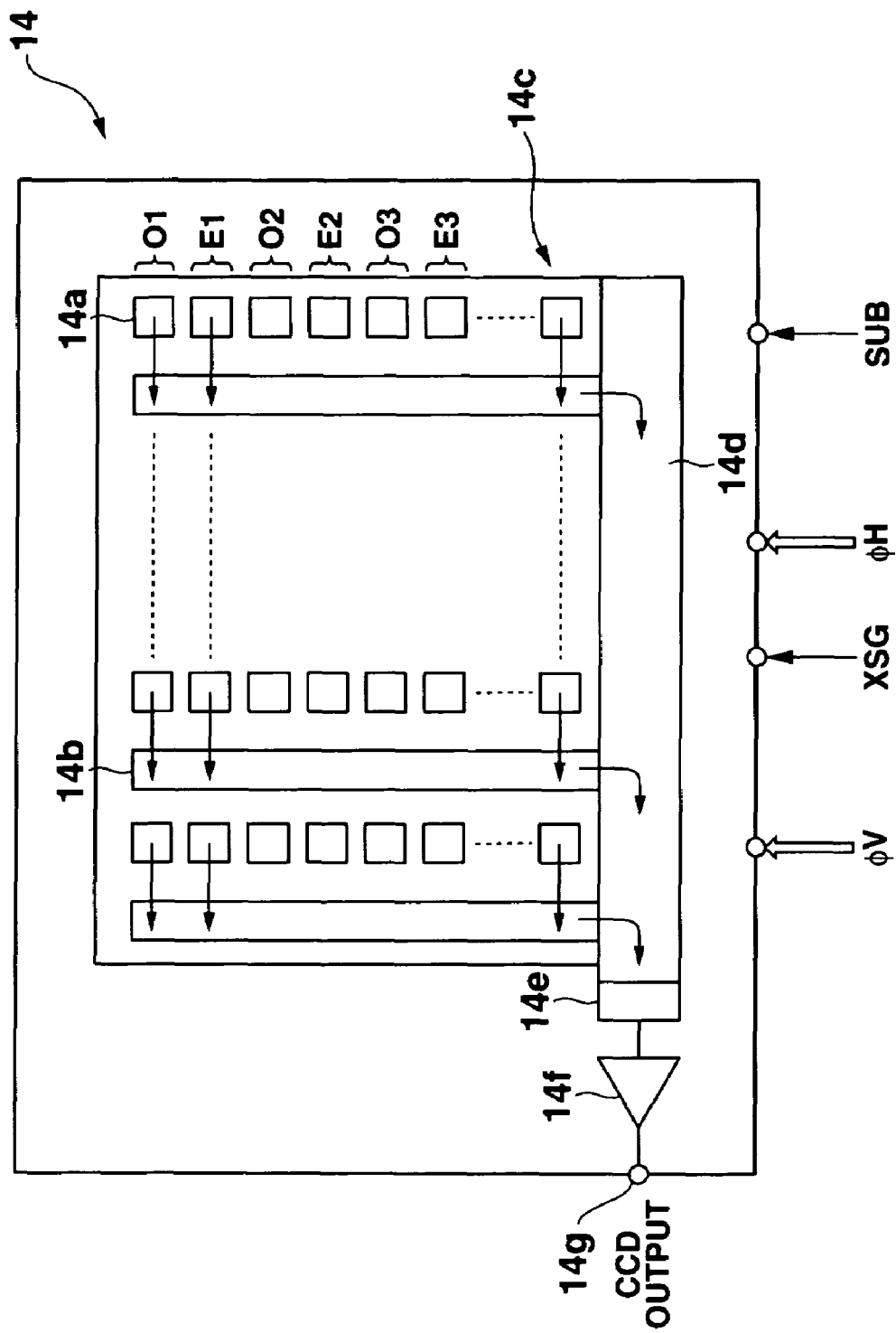
FIG. 2 is a schematic view of a CCD having n (columns)×m (rows) pixels, which is used in the electronic still camera shown in FIG. 1.

FIG. 2 is a schematic view of the CCD 14. The CCD 14 has an image sensing region 14c formed by arranging, in a matrix, n×m photoelectric conversion elements 14a for accumulating charges in correspondence with the amount of incoming light, and also a total of n vertical transfer units 14b between neighboring columns, and further has a horizontal transfer unit 14d which is arranged below the image sensing region 14c in the plane of the page.

A signal charge accumulated in each photoelectric conversion element 14a is fetched by the neighboring vertical transfer unit 14b in response to a read signal XSG applied from the driver 15 (see FIG. 1), and is transferred in turn downward in FIG. 1 inside the vertical transfer unit 14b in synchronism with vertical transfer clocks φV. The output terminals of all the vertical transfer units 14b are connected to the horizontal transfer unit 14d, which sequentially fetches signal charges for one line in synchronism with the vertical transfer clocks φV. The signal charges fetched into the horizontal transfer unit 14d are transferred in turn to the left in FIG. 1 in synchronism with horizontal transfer clocks φH. The signal charges which have reached the output terminal of the horizontal transfer unit 14d are converted into electrical signals by a charge detector 14e, and are amplified by an amplifier 14f. After that, the amplified signals are externally output as a CCD output from a terminal 14g.

Note that SUB is a signal voltage (so-called charge sweep pulse) for clearing the charges accumulated in all the photoelectric conversion elements 14a to a substrate. The time interval from the application timing of this SUB until that of XSG defines the charge accumulation time of the CCD, i.e., the electronic shutter time. The exposure time in field read is controlled by opening/closing operations (the application timings of SUB and XSG) of the electronic shutter, and the exposure time in frame read is controlled by opening operation of the electronic shutter (application timing of SUB) and closing operation of the mechanical shutter 12 (see FIG. 1).

In field read, in the CCD 14 shown in FIG. 2, pixel signals of odd line Oi (i=1, 2, 3, . . . ) and even line Ei of the photoelectric conversion elements 14a are added and are output at the same time. In frame read, pixel signals of odd line Oi and even line Ei are alternately output.

Figure 3:
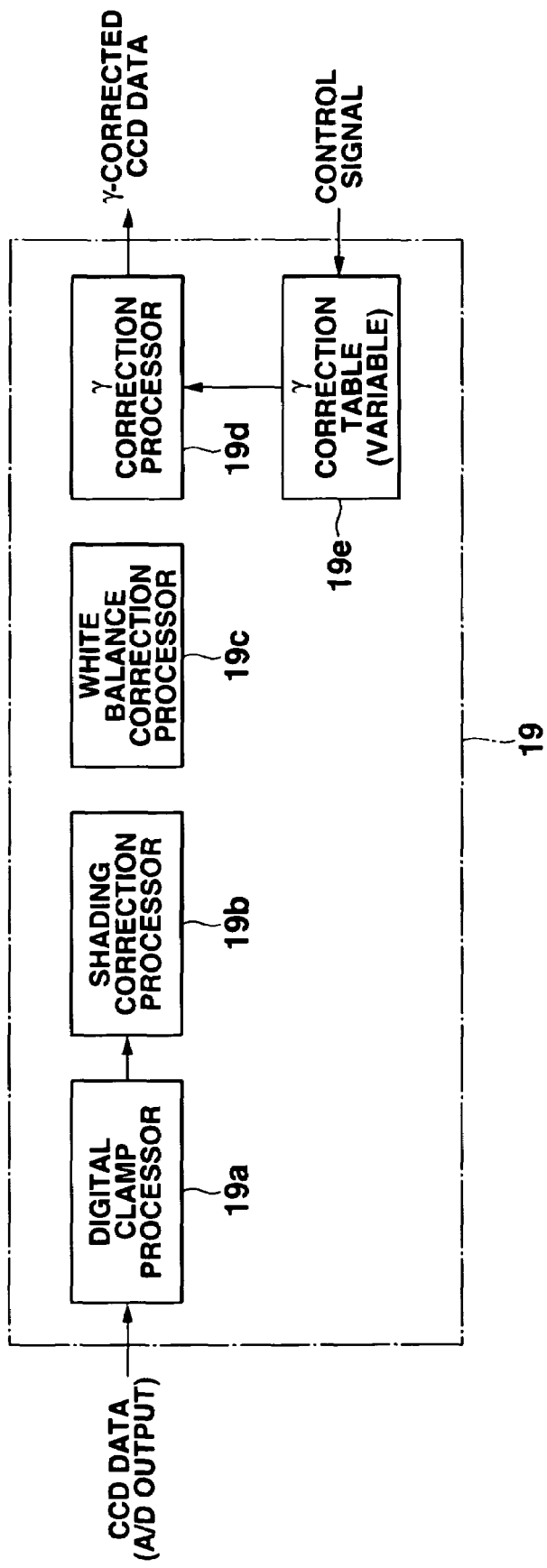
FIG. 3 is a schematic block diagram of a signal processing LSI including a gamma correction processing circuit, which is used in the electronic still camera shown in FIG. 1.

FIG. 3 is a block diagram showing the arrangement of the gamma correction circuit 19. The gamma correction circuit 19 includes a digital clamp processor 19a, shading correction processor 19b, white balance correction processor 19c, gamma correction processor 19d, gamma correction table selector 19e, and the like, although the present invention is not particularly limited to these processors. The gamma correction circuit 19 receives a digital image signal converted by the A/D converter 18 (see FIG. 1), executes a digital clamp process, shading correction process, white balance correction process, and gamma correction process in turn with respect to that image signal, and outputs the corrected image signal to the color process circuit 20 (see FIG. 1).

Figure 4A:
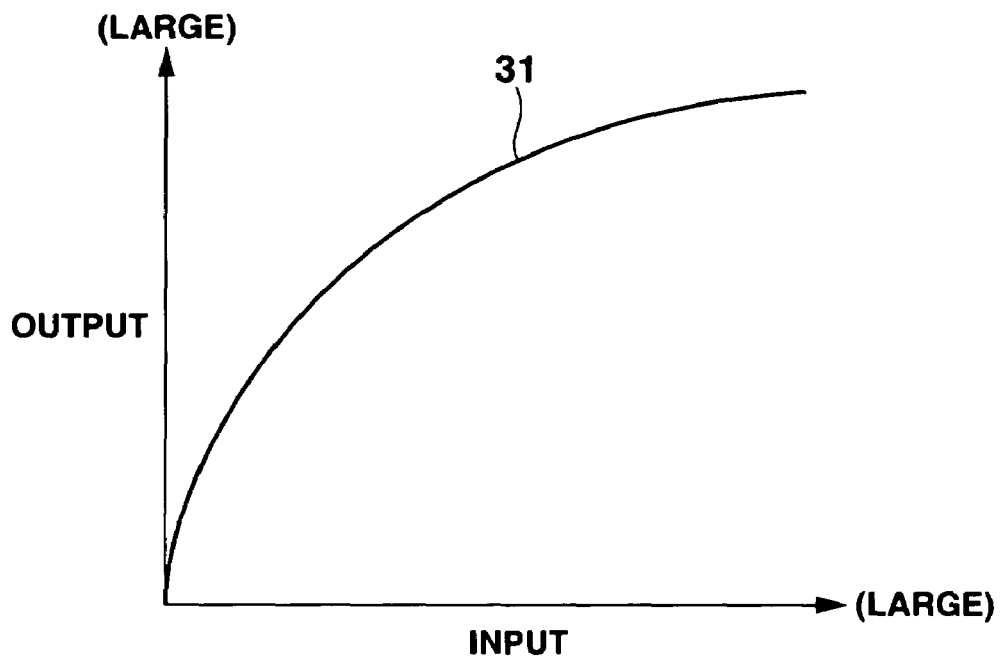
FIGS. 4A and 4B are graphs showing the characteristics of gamma correction tables respectively having nonlinear and linear characteristics.
Figure 4B:
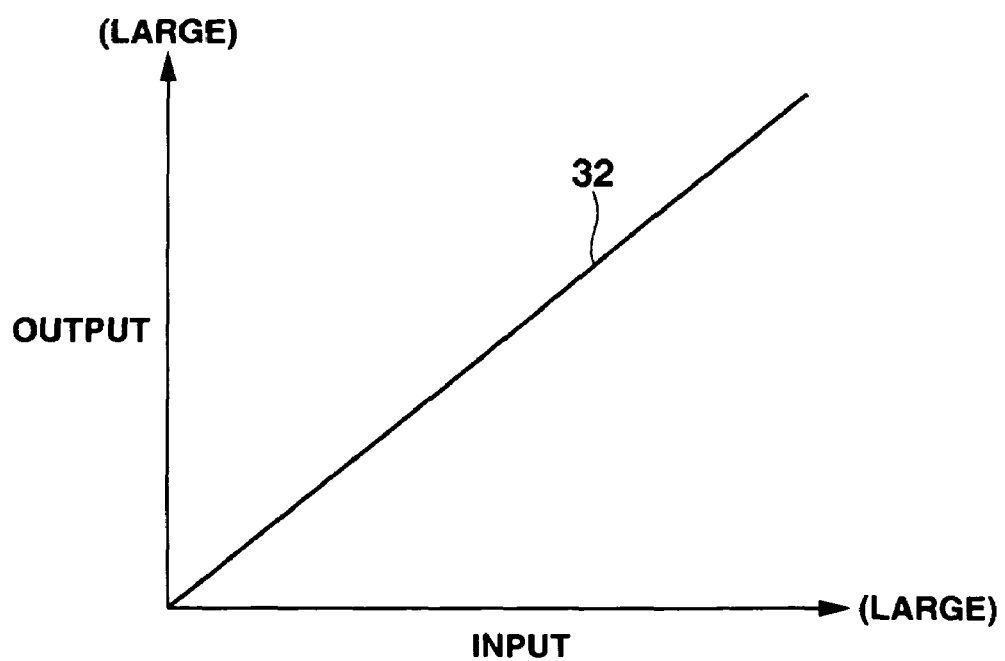

In the gamma correction process, one of two different gamma correction characteristics 31 and 32 shown in FIGS. 4A and 4B is selectively used in accordance with a control signal from the CPU 25. The first gamma correction characteristic 31 is a "nonlinear" one (see FIG. 4A), and the second gamma correction characteristic 32 is a "linear" one (FIG. 4B). When the first gamma correction characteristic 31 is used, gamma correction is implemented in accordance with its nonlinear characteristic, while when the second gamma correction characteristic 32 is used, substantially no gamma correction is made.

Figure 5:
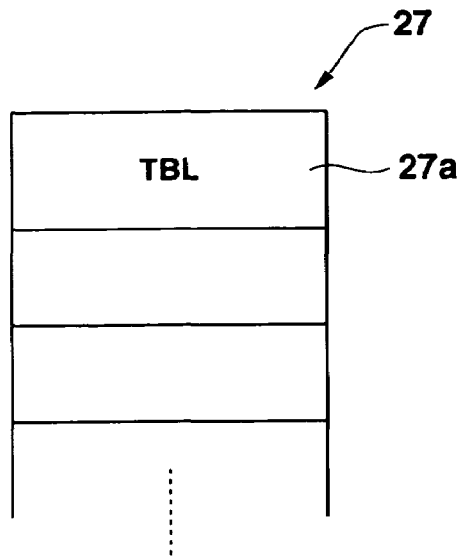
FIG. 5 shows the memory area structure of a data memory of the electronic still camera shown in FIG. 1.

FIG. 5 shows the memory structure of the data memory 27. The data memory 27 has at least one storage area 27a, which stores a correction data table (to be referred to as "TBL" hereinafter) to be applied to CCD image data (to be referred to as "dark frame image" hereinafter) obtained when the CCD 14 undergoes exposure for predetermined time Ta (e.g., Ta=1 sec; the same applies to the following description) while intercepting incoming light to itself.

Figure 6:
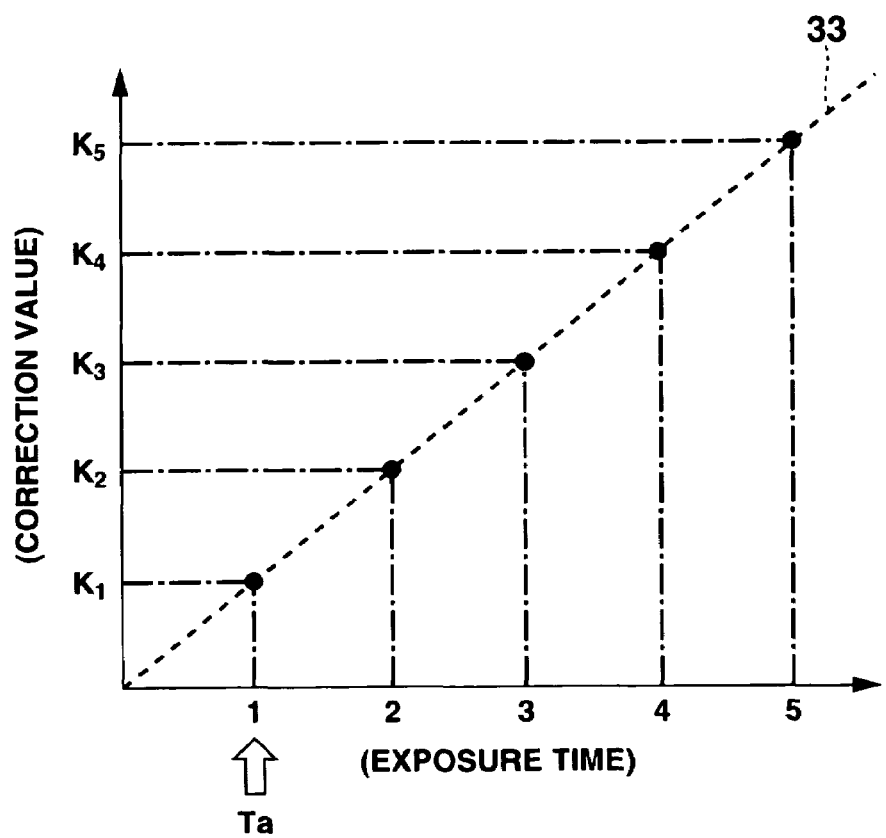
FIG. 6 is a graph showing the concept of a correction data table (TBL) stored in the data memory shown in FIG. 5.

FIG. 6 shows the concept of TBL which stores correction values corresponding to exposure times of long-time exposure. Note that the correction value is determined exposure time T1 of DATA1 and exposure time Ta of DATA2 (to be described later). In the example shown in FIG. 6, the exposure times have discrete values, i.e., 1 sec, 2 sec, 3 sec, 4 sec, 5 sec, and the exposure values have values ($K_1$, $K_2$, $K_3$, $K_4$, $K_5$, . . . ) in units of exposure times. However, the present invention is not limited to this, and linear values may be assigned. Note that correction value $K_1$ of an exposure time (1 sec) corresponding to predetermined time Ta is "1", and the respective correction values including this correction value $K_1$ are given by a linear function line 33 with a slope "A". This is because a normal CCD has characteristics in that the magnitude of the dark current component increases proportionally to A times (e.g., A=2) the exposure time.

In this case, the correction values are held in units of exposure times. However, when the relationship between the exposure time and correction value is correction value=exposure time (slope="1"), as shown in FIG. 6, since the exposure time can be used as a correction value, the correction values need not be held in units of exposure times.

When the relationship between the exposure time and correction value can be expressed by a formula such as a linear function formula, quadratic function formula, or the like, only the formula may be held in the data memory 27, and a correction value may be derived by substituting the exposure value in the formula.

The operation will be explained below.

Figure 7:
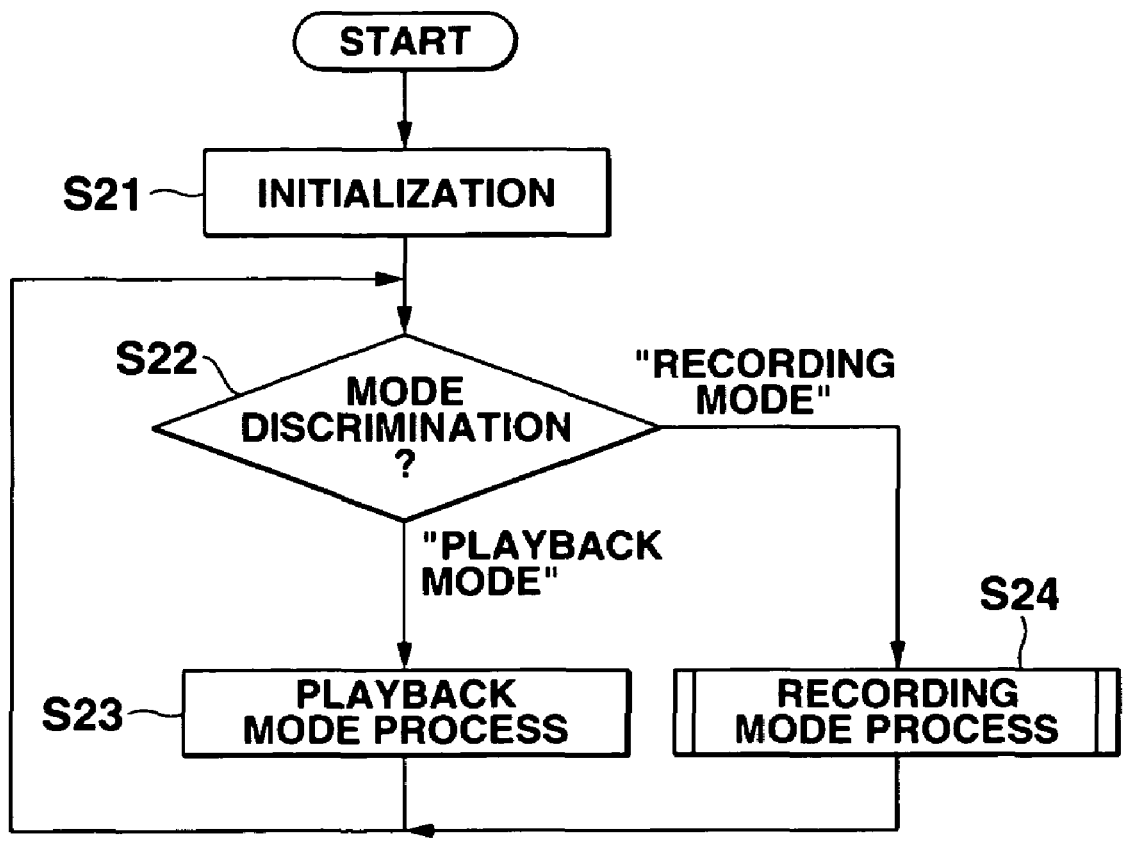
FIG. 7 is a general flow chart of a control program of the electronic still camera according to the present invention.

FIG. 7 is a schematic flow chart showing an outline of a control program executed by the CPU 25. Execution of this program begins when a power switch (not shown) of the electronic still camera is turned on. The program executes initialization such as operation checking and the like first (step S21), and then repeats operation for checking the operation mode (recording or playback mode) (step S22), and executing a branch process (a playback mode process in step S23 or a recording mode process in step S24) in accordance with the checking result. Note that other operation modes such as a system setup mode and the like are also available, but a description of such modes will be omitted for the sake of simplicity.

To summarize, the playback mode process reads out the sensed image recorded in the flash memory 24, and plays back and displays it on the liquid crystal display 29, and a detailed description of this process will be omitted since it is not important for the present invention.

Figure 8:
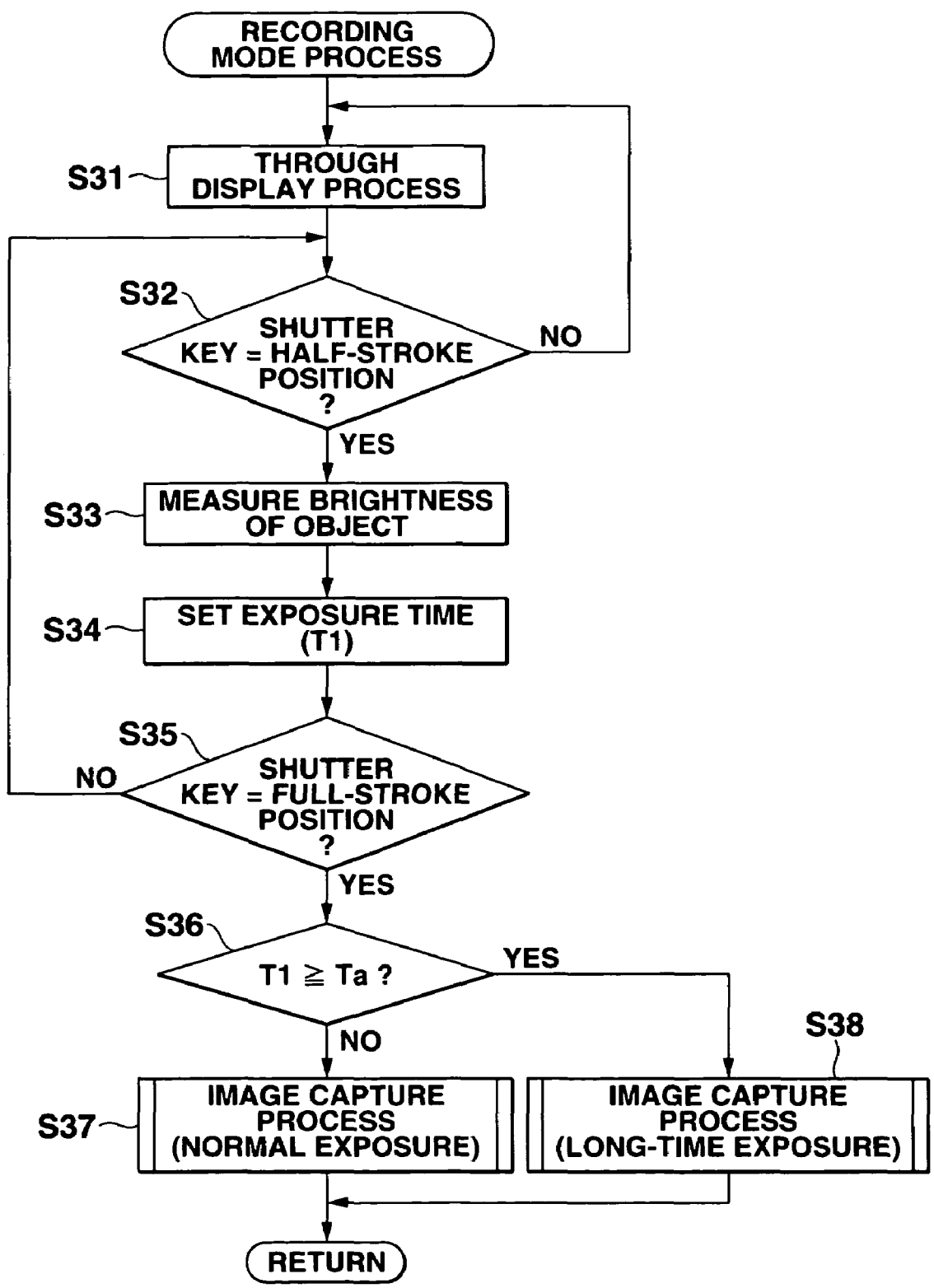
FIG. 8 is a flow chart showing the operation of a control program of a recording mode process shown in FIG. 7.

FIG. 8 is a flow chart showing the recording mode process program. When this flow chart starts, a display process of a through image (finder image) is executed (step S31), and repeats itself until a "half-stroke" operation of the shutter key is detected (step S32). Note that the through image is a moving picture output from the CCD 14 at a predetermined cycle (e.g., 1/30-sec cycle). When this moving image is displayed on the liquid crystal display 29, the user can easily confirm and adjust the composition.

After that, if a "half-stroke" operation of the shutter key is detected, the brightness of an object is measured using output data from a photometry sensor (not shown) and the CCD 14 (step S33) to compute an optimal exposure time (to be referred to as "T1" for the sake of convenience; unit=seconds), and T1 is set. Also, the degree of opening of the mechanical shutter 12 and the opening/closing timings of the electronic shutter and mechanical shutter 12 are set using T1 (step S34). After that, a "full-stroke" operation of the shutter key is detected (step S35).

If a "full-stroke" operation of the shutter key is detected, it is checked if T1 set in step S34 is equal to or longer than Ta (e.g., 1 sec) (step S36). If NO in step S36, an image capture process for normal exposure (exposure time shorter than long-time exposure to be described later) is executed (step S37); otherwise, an image capture process for long-time exposure is executed (step S38).

<Image Capture Process (Long-Time Exposure)>

FIGS. 9 to 12 are flow charts of the image capture process program for long-time capture. In this flow chart, a linear gamma correction characteristic (second gamma correction characteristic 32) is selected (step S38a). In this manner, the gamma correction circuit 19 has an I/O characteristic based on the linear gamma correction characteristic shown in FIG. 4B, i.e., substantially disables the gamma correction process.

The electronic shutter is then "opened" (step S38b), and the control waits for an elapse of T1. After an elapse of T1, the mechanical shutter 12 and electronic shutter are "closed" (step S38d). Note that the mechanical shutter 12 and electronic shutter need not always be closed at the same timing, and the electronic shutter may be closed after the mechanical shutter 12 is closed or vice versa. Alternatively, the electronic shutter alone may be closed at this timing, and the mechanical shutter 12 may be closed after a CCD image is captured.

In step S38e, a CCD image is captured, and is temporarily stored in the buffer memory 22. If this CCD image is called "DATA1" for the sake of convenience, DATA1 is characterized in that it includes a large dark current component corresponding to exposure time T1 equal to or longer than predetermined time Ta, and does not undergo any gamma correction in the gamma correction circuit 19.

The electronic shutter is "opened" while the mechanical shutter 12 remains "closed" (step S38f), and the control waits for an elapse of predetermined time Ta (step S38g). That is, since Ta is, e.g., 1 sec, as described above, the electronic shutter is "closed" after an elapse of 1 sec (step S38h) to capture a CCD image (step S38i), and the mechanical shutter 12 (step S38j) is "opened" to store that CCD image in the buffer memory 22 as a dark frame image corresponding to the exposure time of Ta sec (step S38k). In this case, the opening timing of the mechanical shutter 12 is set between the CCD image capture timing in step S38i and the dark frame data storage timing in step S38k, but the mechanical shutter 12 can be opened at any timing after the electronic shutter is closed in step S38h.

If the CCD image stored in the buffer memory 22 in step S38k is called "DATA2" for the sake of convenience, since this DATA2 is a CCD image obtained when the CCD 14 undergoes exposure for Ta sec with the mechanical shutter 12 closed, in other words, with incoming light to the CCD 14 intercepted, this CCD image includes only noise components (dark current component+random noise component) of the CCD 14 corresponding to Ta sec. Therefore, by subtracting this DATA2 from the actually sensed image (DATA1), the noise components including the dark current component can be removed. In this case, the sensed image which is to undergo this subtraction process is limited to the one having exposure time Ta, since the exposure time of DATA2 is Ta. When the sensed image with an exposure time beyond Ta undergoes the subtraction process, a correction value corresponding to that exposure time is read out from the TBL 27a to correct DATA2, and the corrected DATA2 can be subtracted from that sensed image.

More specifically, a correction value corresponding to exposure time T1 is read from the TBL (see FIG. 6) (step S38l), and the pixel values of DATA2 are corrected using the read correction value (step S38m). Note that each pixel value is corrected by multiplying it with the correction value.

If T1=Ta, correction value $K_1$ is read out from the TBL. Since this correction value $K_1$ is "1", as described above, the pixel values of corrected DATA2 are multiplied by 1, i.e., are substantially not corrected. On the other hand, if T1 is a value larger than Ta, e.g., 2 sec, 3 sec, 4 sec, or 5 sec, correction value $K_2$, $K_3$, $K_4$, or $K_5$ is read out from the TBL. Since such correction value $K_2$, $K_3$, $K_4$, or $K_5$ is larger than 1 (F for the sake of convenience), as shown in FIG. 6, the corrected pixel values of DATA2 are F times those before correction, i.e., the pixel values can be corrected in correspondence with T1.

In this manner, after DATA2 has undergone pixel value correction in correspondence with T1, "0" is set in loop variables i and j for pixel selection to reset them (step S38n), and a value of pixel (i, j) of the corrected DATA2 is extracted (step S38o). In addition, it is checked if the extracted value is equal to or higher than a predetermined level corresponding to a white scratch defect (step S38p).

If YES in step S38p, the value of pixel (i, j) of DATA1 is extracted (step S38q), and it is checked if the extracted value has reached a pixel value saturation level (step S38r). If NO in step S38r, the value of pixel (i, j) of the corrected DATA2 is subtracted from the value of pixel (i, j) of DATA1 (step S38s), and loop variable i is incremented by 1 (step S38t). Then, a loop from steps S38o to S38u repeats itself until the evaluation result of formula "i>imax" (imax is the number of pixels per line of DATA1) becomes True (step S38u).

If the evaluation result of formula "i>imax" becomes True in step S38u, loop variable i is reset to select the next line of each of DATA1 and DATA2 as the line to be processed, and loop variable j is incremented by 1 (step S38v). Then, a loop from steps S38o to S38w repeats itself until the evaluation result of formula "j>jmax" (jmax is the number of lines of DATA1) becomes True (step S38w).

If the evaluation result of formula "j>jmax" becomes True in step S38w, DATA1 undergoes a software gamma correction process (step S38x) and a compression process by the compression/expansion circuit 23 (step S38y). After that, DATA1 is recorded in the flash memory 24 (step S38z), thus ending the program.

Note that the software gamma correction process is a process that has a correction effect equivalent to the non-linear gamma process in the gamma correction circuit 19, but is different from that process in the gamma correction circuit 19 since it is executed by the CPU 25 (by software).

As described above, in the image capture process program for long-time exposure in this embodiment, after a sensed image (DATA1) is captured by exposing the CCD 14 for T1 sec with the mechanical shutter 12 opened, a dark frame image (DATA2) is captured by exposing the CCD 14 for an exposure time corresponding to predetermined time Ta with the mechanical shutter 12 closed. A correction value ($K_2$, $K_3$, $K_4$, or $K_5$, . . . ) corresponding to exposure time T1 of the sensed image data (DATA1) is read out from the correction data table (TBL), the pixel values of the dark frame image (DATA2) are corrected using this correction value, and the sensed image (DATA1) is corrected using the corrected dark frame image (DATA2). Hence, deterioration of image quality upon image sensing can be avoided by removing DATA2 components (dark current component+random noise component) from DATA1.

Therefore, since the time required for generating the dark frame image (DATA2) is predetermined time Ta shorter than exposure time T1 of the actually sensed image (DATA1), the total image sensing time of DATA1 and DATA2 becomes T1+T2 if no other conditions are considered, and can be shorter than that (T1+T1) in the prior art.

<Image Capture Process (Normal Exposure)>

Figure 12:
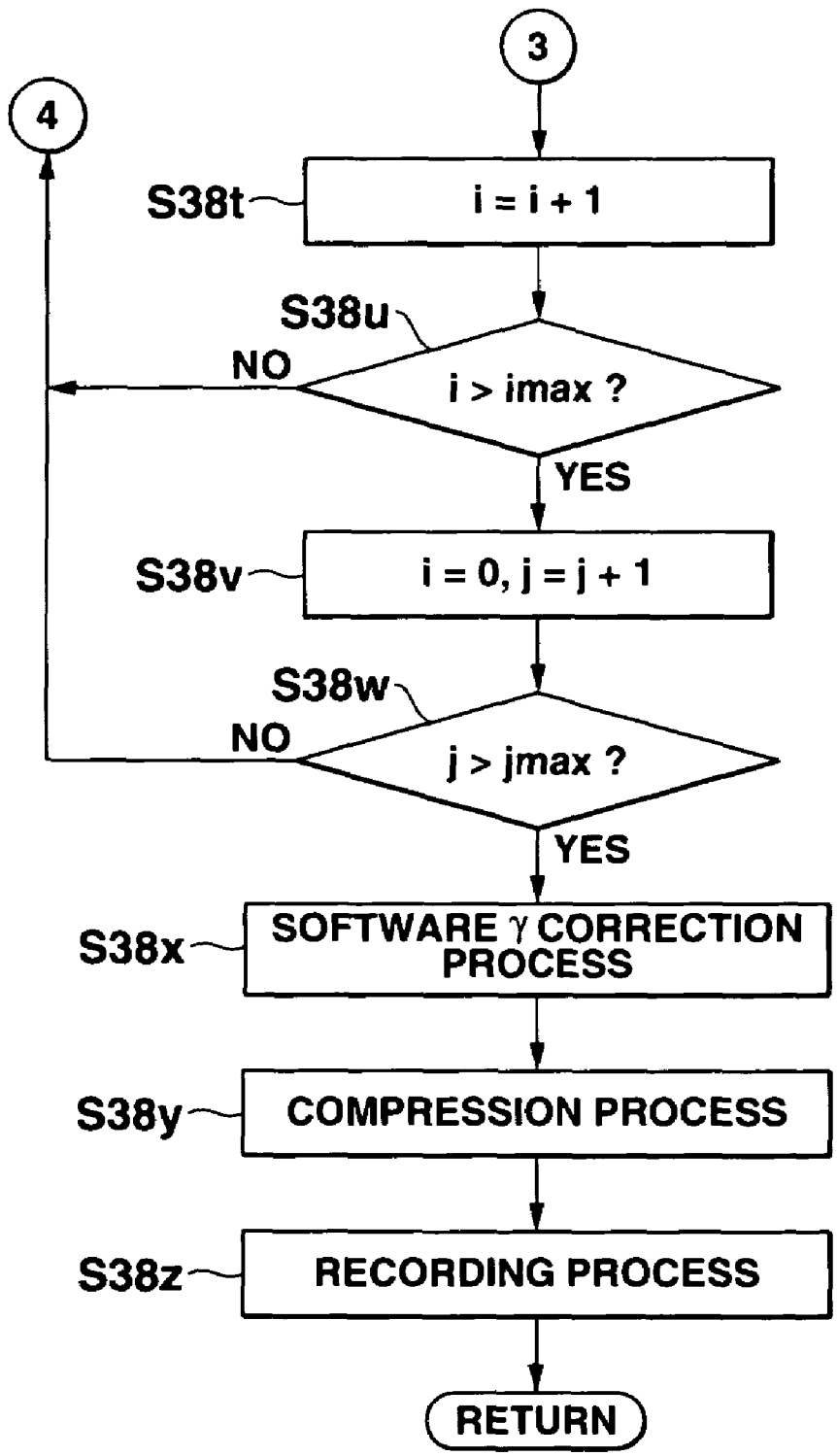
FIG. 12 is a flow chart (4/4) showing the operation of the control program of the image capture process for long-time exposure shown in FIG. 8.
Figure 13A:
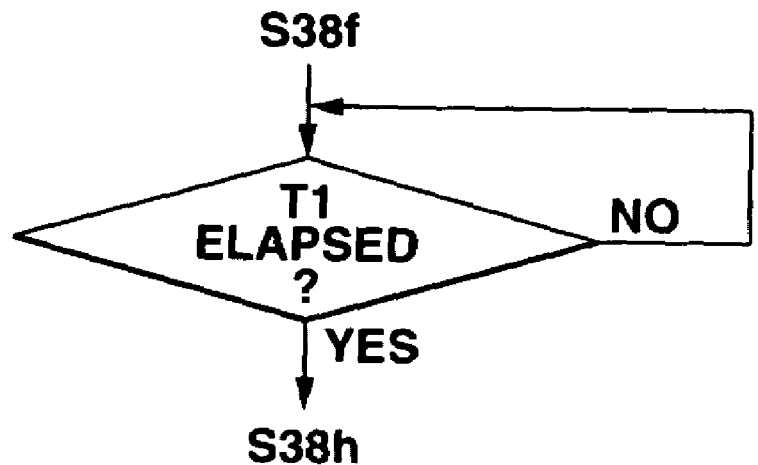
FIGS. 13A and 13B are flow charts showing the operation of a control program of an image capture process for normal exposure shown in FIG. 8.
Figure 13B:
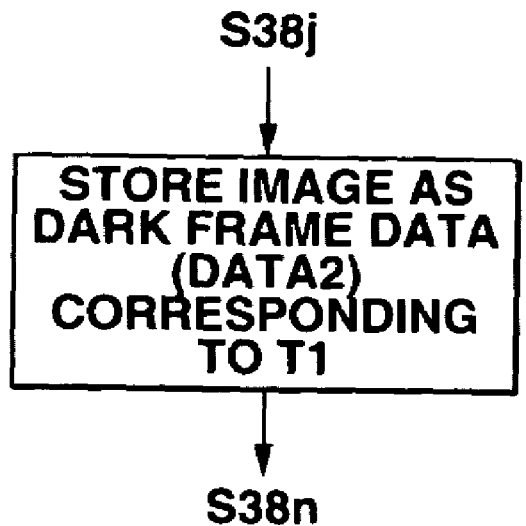

FIGS. 13A and 13B are flow charts of the image capture process program for normal exposure, and substantially the same processing steps as those in the aforementioned image capture processing program for long-time exposure (FIGS. 9 to 12) are executed except for the processing steps shown in FIGS. 13A and 13B.

Figure 10:
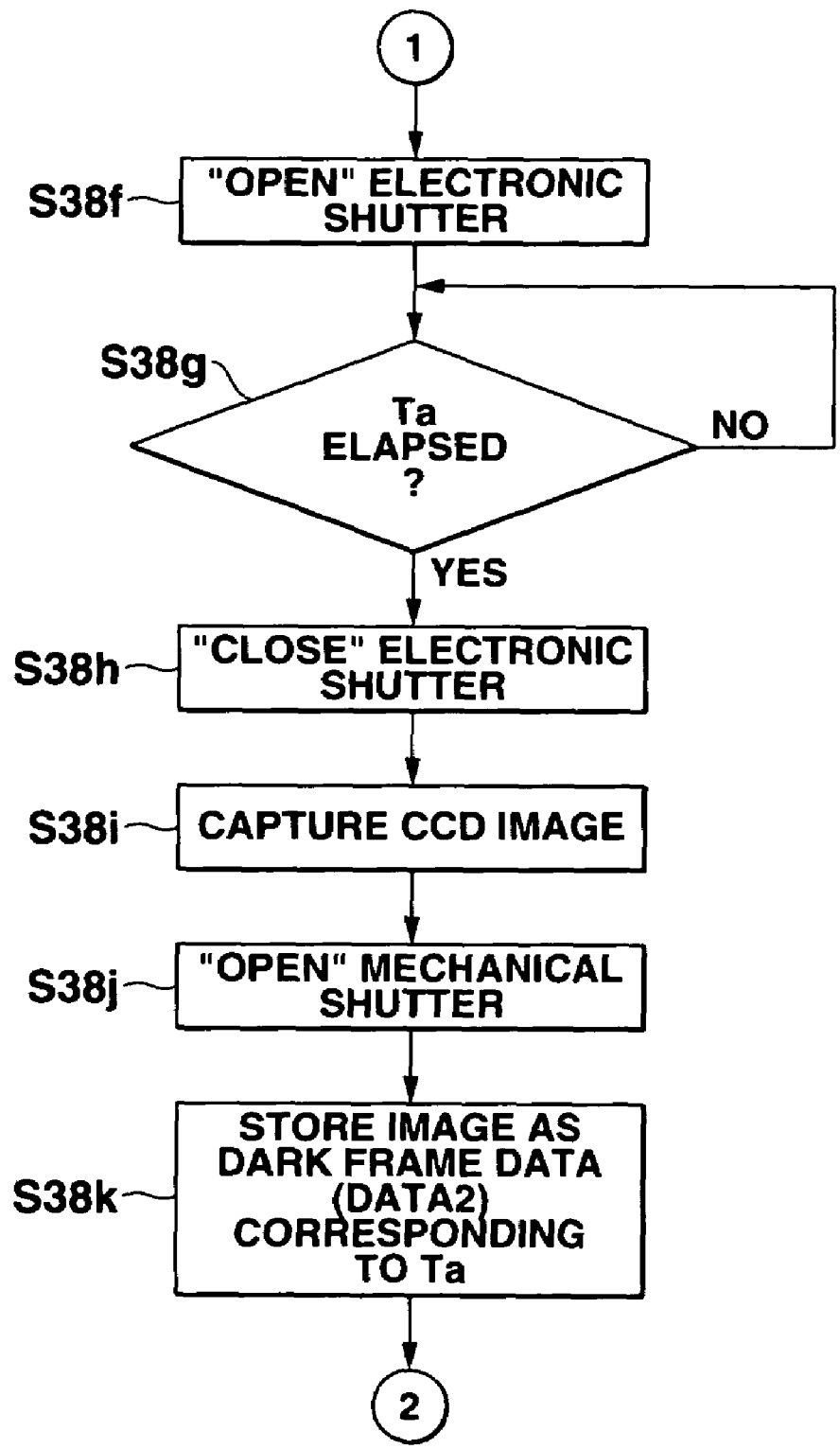
FIG. 10 is a flow chart (2/4) showing the operation of the control program of the image capture process for long-time exposure shown in FIG. 8.

More specifically, after the electronic shutter is "opened" in step S38f in FIG. 10, the flow advances to the processing step shown in FIG. 13A, and the control waits for an elapse of time T1. After that, the flow returns to step S38h in FIG. 10 to "close" the electronic shutter.

On the other hand, after the electronic shutter is "opened" in step S38j in FIG. 10, the flow advances to the processing step shown in FIG. 13B, and a CCD image is stored in the buffer memory 22 as a dark frame image corresponding to an exposure time=T1 sec. After that, the flow returns to step S38n in FIG. 11.

That is, "Ta" in processing steps S38g and S38k in FIG. 10 is changed to "T1", and processing steps S38l and S38m are omitted.

Therefore, in the image capture process program for normal exposure of this embodiment, after a sensed image (DATA1) is captured by exposing the CCD 14 for T1 sec with the mechanical shutter 12 opened, a dark frame image (DATA2) is captured by exposing the CCD 14 for T1 sec with the mechanical shutter 12 closed. Then, when the sensed image (DATA1) is corrected using this dark frame image (DATA2), deterioration of image quality upon image sensing can be avoided by removing DATA2 components (dark current component+random noise component) from DATA1. That is, in the normal exposure process (i.e., an exposure process with exposure time T1 less than predetermined time Ta), since the exposure time of DATA1 is set to be equal to that of DATA2, DATA1 can undergo dark current correction without correcting the dark frame image (DATA2).

In the aforementioned embodiment, white scratch discrimination (step S38p) and discrimination as to whether or not the data level is saturated (step S38r) are made to determine if the subtraction process of DATA2 from DATA1 (step S38s) is required. Alternatively, DATA2 may be unconditionally subtracted from DATA1 without such discrimination processes.

In the aforementioned embodiment, the exposure time (T1) is determined by computing an optimal exposure time on the basis of the brightness of an object measured using output data from the photometry sensor or CCD 14 (see steps S33 and S34 in FIG. 8). Alternatively, the user may arbitrarily set an exposure time (T1) of his or her choice by operating the key input unit 26.

Figure 14:
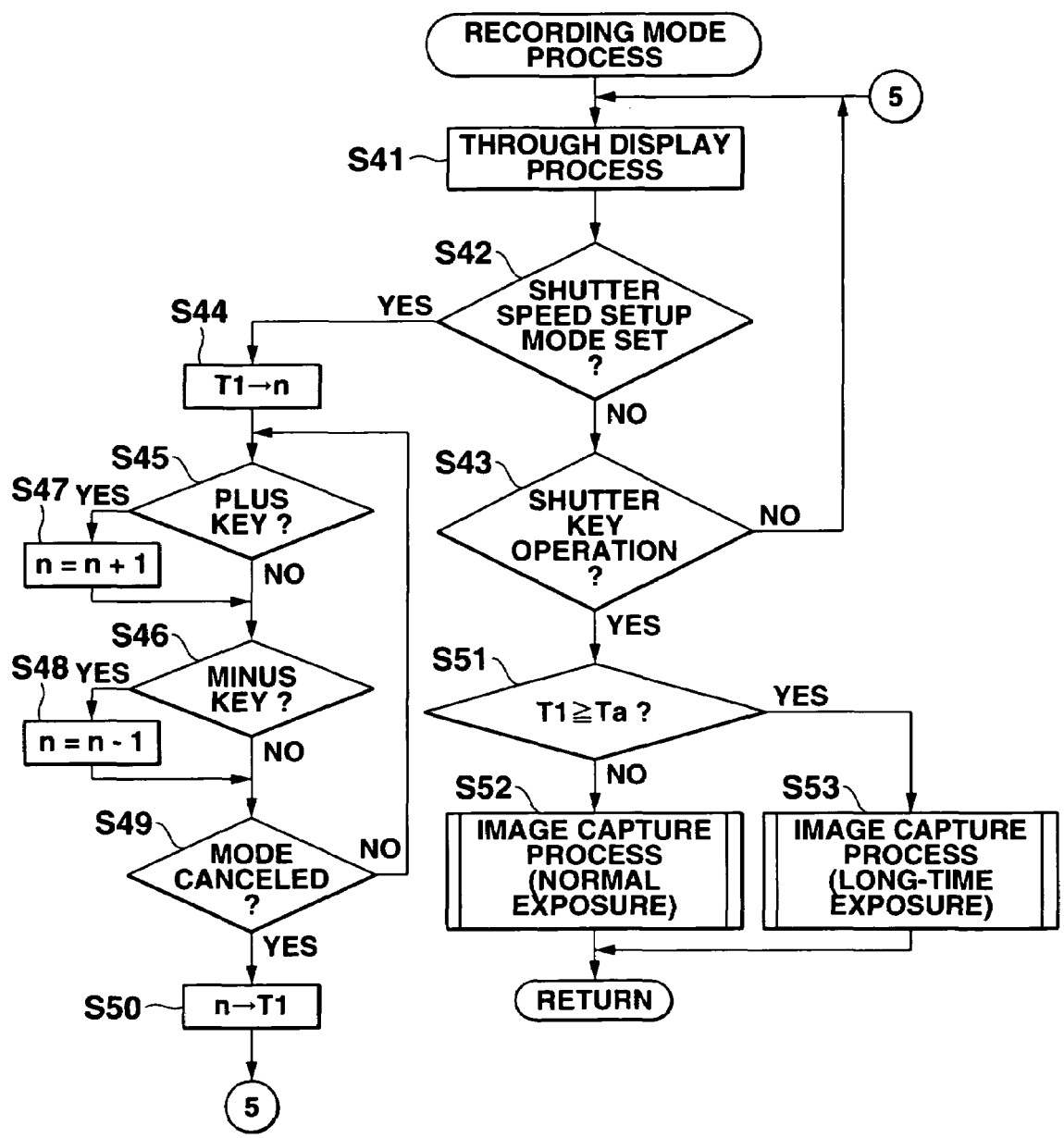
FIG. 14 is a flow chart showing the operation of another control program of the recording mode process shown in FIG. 7.

FIG. 14 is a flow chart of the recording mode process program when the user sets the exposure time (T1), i.e., a modification of the recording mode process program shown in FIG. 8.

When this flow chart starts, a display process of a through image (finder image) is executed (step S41), and repeats itself until a shutter speed (exposure) setup mode is set by a mode key provided to the key input unit 26 (step S42) or depression of the shutter key is detected (step S43).

After that, if the shutter speed setup mode is set, exposure time T1 set as a default value or exposure time T1 set in the previous shutter speed setup operation is read out from the data memory 27, and is temporarily stored in the user work RAM 25b as value "n" (step S44).

It is then checked if the user has operated a plus or minus key provided to the key input unit 26 (steps S45 and S46). If the user has operated the plus key, value "n" stored in the user work RAM 25b is incremented by 1 (step S47); if the user has operated the minus key, value "n" stored in the user work RAM 25b is decremented by 1 (step S48).

These processes (steps S45 to S48) repeat themselves until it is determined in step S49 the shutter speed setup mode is canceled by the mode key provided to the key input unit 26.

If cancel of the mode is detected in step S49, value "n" stored in the user work RAM 25b at the time of cancel is determined as exposure time T1, and is stored in the data memory 27 (step S50). After that, the flow returns to step S41 to restart the through image display process.

Note that exposure time T1 may be set by displaying a selection menu on the liquid crystal display 29, and making the user select a desired exposure time from the menu using given keys.

If depression of the shutter key is detected in step S43, it is checked if exposure time T1 set in step S50 is equal to or longer than Ta (step S51). If NO in step S51, an image capture process for normal exposure is executed (step S52); otherwise, an image capture process for long-time exposure is executed (step S53).

In the image capture process for long-time exposure in the aforementioned embodiment, the exposure time (shutter speed) of DATA2 is fixed at Ta, and the correction amount (correction factor) of DATA2 is controlled to change in correspondence with exposure time T1. By contrast, the correction amount (correction factor) of DATA2 may be fixed, and the exposure time of DATA2 may be controlled to change in correspondence with exposure time T1.

Figure 15A:
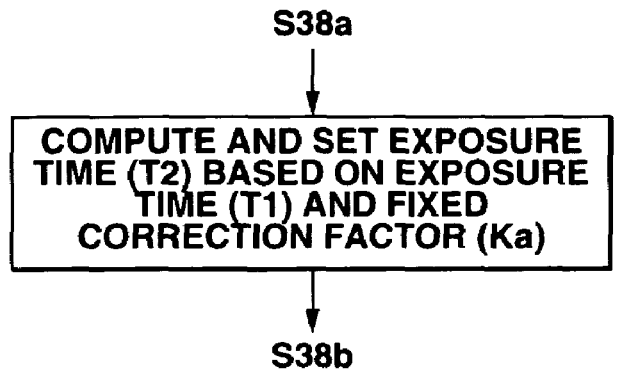
FIGS. 15A to 15C are flow charts showing the operation of another control program of the image capture process for long-time exposure shown in FIG. 8.
Figure 15B:
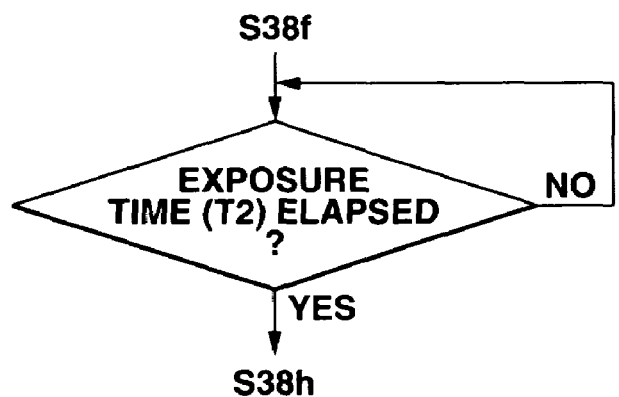
Figure 15C:
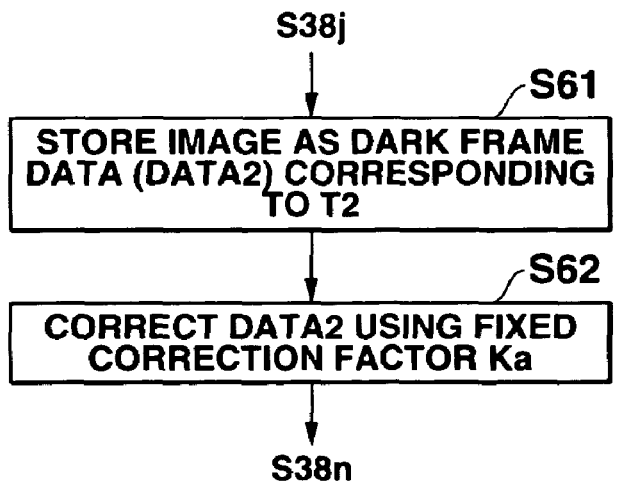

FIGS. 15A to 15C are flow charts of the image capture process program for long-time exposure used when the correction amount (correction factor) of DATA2 is fixed, and the exposure time of DATA2 is controlled to change in correspondence with exposure time T1, and substantially the same processing steps as those in the aforementioned image capture processing program for long-time exposure (FIGS. 9 to 12) are executed except for the processing steps shown in FIGS. 15A to 15C.

Figure 9:
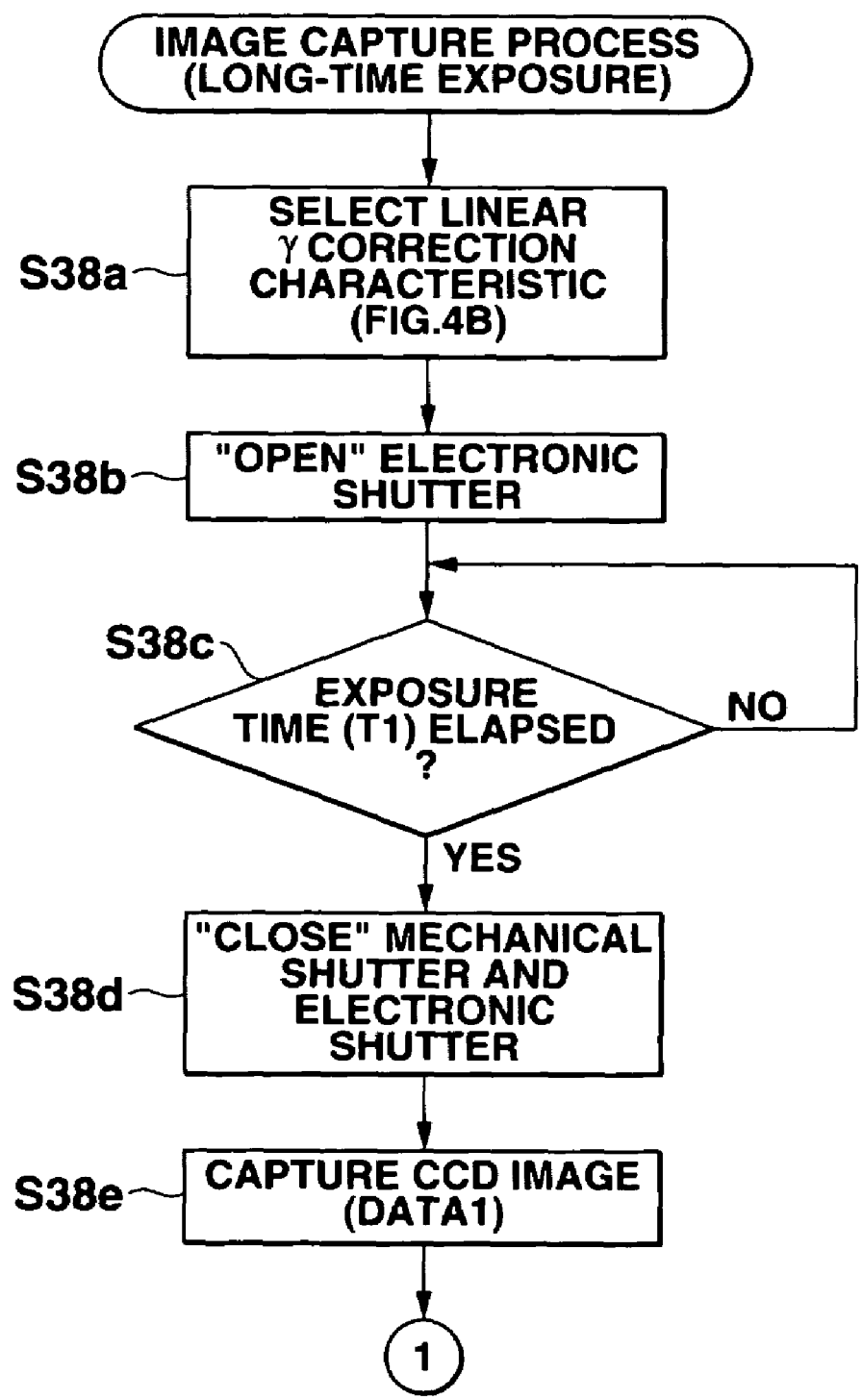
FIG. 9 is a flow chart (1/4) showing the operation of a control program of an image capture process for long-time exposure shown in FIG. 8.

More specifically, after the linear γ correction characteristic is selected in step S38a in FIG. 9, the flow advances to the processing step in FIG. 15A to determine exposure time T2 of DATA2 on the basis of exposure time T1 of DATA1 and fixed correction factor Ka (e.g., 2×) of DATA2. The flow then returns to step S38b in FIG. 9 to "open" the electronic shutter. Note that the method of computing exposure time T2 is not limited to the aforementioned method. For example, a correspondence table of exposure times T1 and T2, which is similar to that described above using FIGS. 5 and 6 may be held, and exposure time T2 may be computed by looking up this correspondence table.

After the electronic shutter is "opened" in step S38f in FIG. 10, the flow advances to the processing step in FIG. 15B, and the control waits for an elapse of time T2 determined in the processing step in FIG. 15A. The flow then returns to step S38h in FIG. 10 to "close" the electronic shutter.

After the electronic shutter is "opened" in step S38j in FIG. 10, the flow advances to step S61 in FIG. 15C to store a CCD image in the buffer memory 22 as a dark frame image (DATA2) corresponding to exposure time=T2 sec, and the pixel values of DATA2 are corrected using fixed correction factor Ka (step S62). After that, the flow returns to step S38n in FIG. 10.

In the image capture process for long-time exposure in the aforementioned embodiment, the exposure time of DATA2 is fixed at Ta, and the correction amount (correction factor) of DATA2 is controlled to change in correspondence with exposure time T1, or the correction amount (correction factor) of DATA2 is fixed and the exposure time of DATA2 is controlled to change in correspondence with exposure time T1. Alternatively, both the exposure time and correction amount of DATA2 may be controlled to change in correspondence with exposure time T1 without being fixed.

Figure 16A:
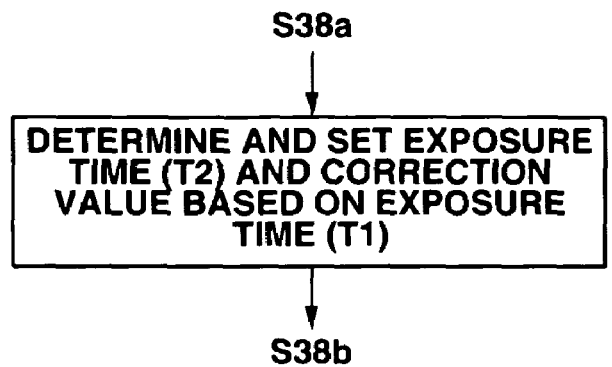
FIGS. 16A to 16C are flow charts showing the operation of still another control program of the image capture process for long-time exposure shown in FIG. 8.
Figure 16B:
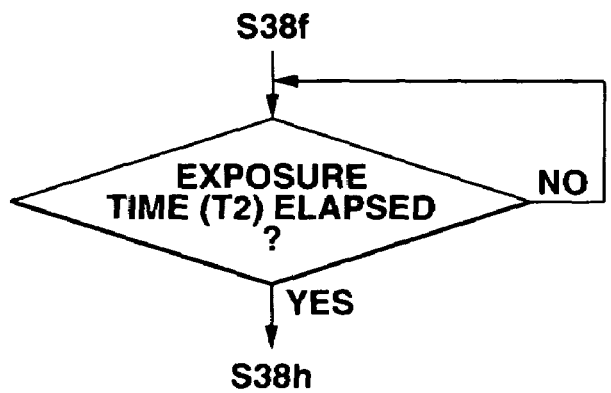
Figure 16C:
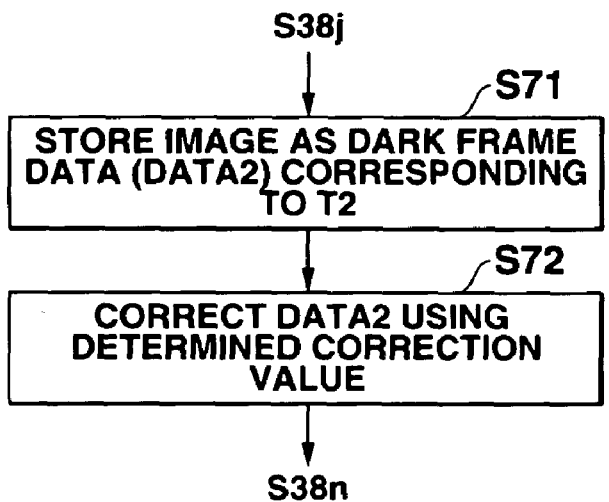

FIGS. 16A to 16C are flow charts of the image capture process program for long-time exposure used when the exposure time and correction amount (correction factor) of DATA2 are controlled to change in correspondence with exposure time T1, and substantially the same processing steps as those in the aforementioned image capture processing program for long-time exposure (FIGS. 9 to 12) are executed except for the processing steps shown in FIGS. 16A to 16C.

In this case, a correspondence table that stores a correspondence between exposure times T1, and exposure times T2 and correction values of DATA2, which is similar to that described above using FIGS. 5 and 6, or a special formula that yields exposure time T2 and correction value of DATA2 from exposure time T1 of DATA1 must be held in advance.

After the linear γ correction characteristic is selected in step S38a in FIG. 9, the flow advances to the processing step in FIG. 16A to determine exposure time T2 and correction value of DATA2 on the basis of exposure time T1 of DATA1, and the flow returns to step S38b in FIG. 9 to "open" the electronic shutter.

After the electronic shutter is "opened" in step S38f in FIG. 10, the flow advances to the processing step in FIG. 16B, and the control waits for an elapse of time T2 determined in the processing step in FIG. 16A. The flow then returns to step S38h in FIG. 10 to "close" the electronic shutter.

After the electronic shutter is "opened" in step S38j in FIG. 10, the flow advances to step S71 in FIG. 16C to store a CCD image in the buffer memory 22 as a dark frame image (DATA2) corresponding to exposure time=T2 sec, and the pixel values of DATA2 are corrected using the correction value determined in the processing step in FIG. 16A (step S72). After that, the flow returns to step S38n in FIG. 10.

In the aforementioned embodiment, when the shutter key has been pressed to its full-stroke position, an actually sensed image (DATA1) is captured (sensed) first, and a dark frame image (DATA2) is then captured (sensed). Contrary to this, after a dark frame image (DATA2) is captured (sensed), an actually sensed image (DATA1) may be captured (sensed).

In the aforementioned embodiment, when the shutter key has been pressed to its full-stroke position to instruct image sensing, a sensed image (DATA1) and dark frame image (DATA2) are captured (sensed). Alternatively, when the shutter key has been pressed to its half-stroke position, a dark frame image (DATA2) may be captured (sensed), and when the shutter key has been pressed to its full-stroke position, a sensed image (DATA1) may be captured (sensed).

Figure 18:
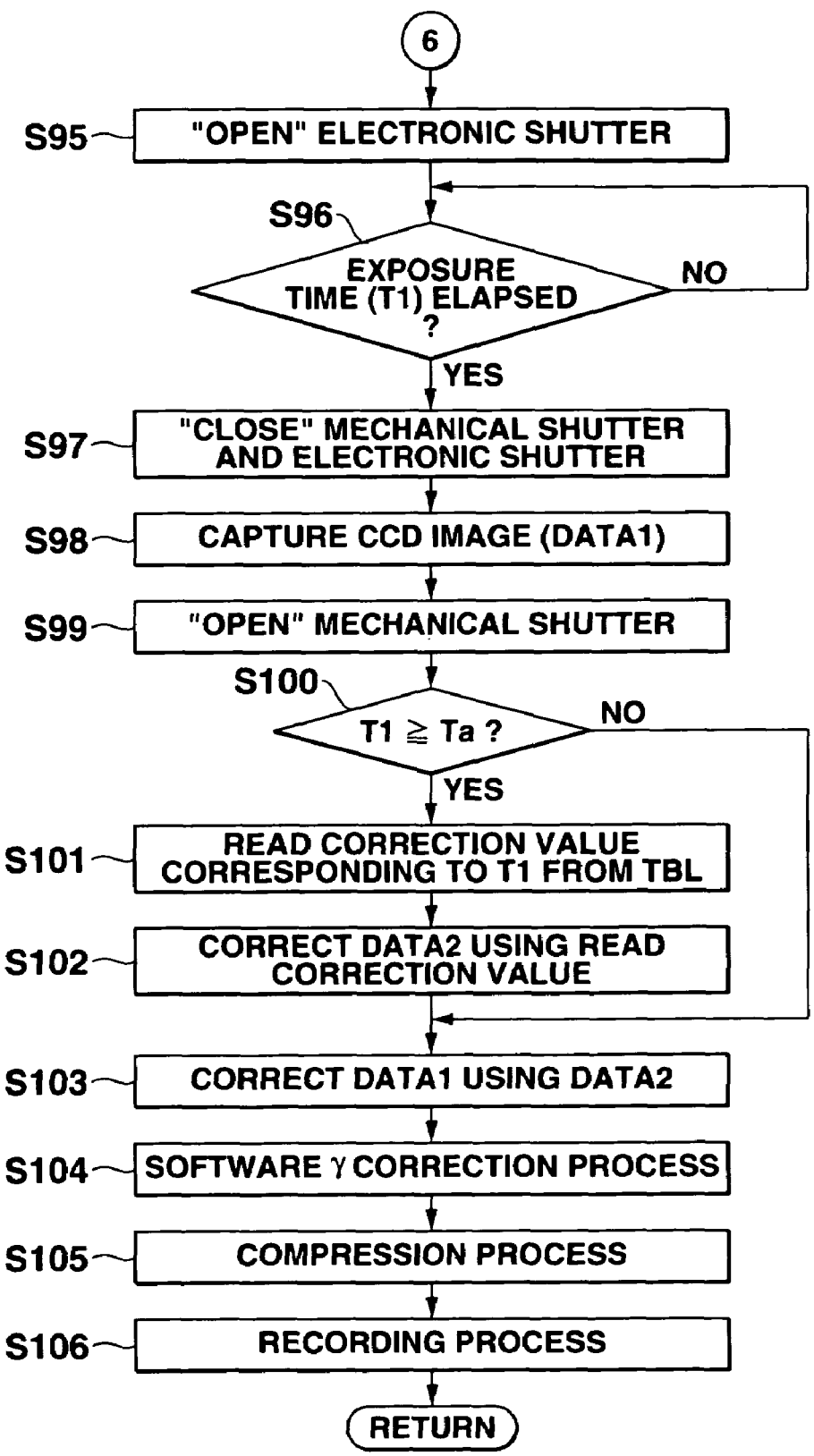
FIG. 18 is a flow chart (2/2) showing the operation of still another control program of the recording mode process shown in FIG. 7.

FIGS. 17 and 18 are flow charts of the recording mode process program used when a dark frame image (DATA2) is captured (sensed) upon depression of the shutter key to the half-stroke position, and a sensed image (DATA1) is captured (sensed) upon depression of the shutter key to the full-stroke position, i.e., a modification of the aforementioned recording mode process program shown in FIGS. 8 to 12.

When the flow chart in FIG. 17 starts, a display process of a through image (finder image) is executed (step S81), and repeats itself until the "half-stroke" operation of the shutter key is detected (step S82).

After that, if a "half-stroke" operation of the shutter key is detected, the linear gamma correction characteristic (second gamma correction characteristic 32) is selected (step 83). Subsequently, the brightness of an object is measured using output data from a photometry sensor (not shown) and the CCD 14 (step S84) to compute an optimal exposure time (to be referred to as "T1" for the sake of convenience; unit=seconds), and T1 is set (step S85). Then, the mechanical shutter 12 is "closed", and the electronic shutter is "opened" (step S86). It is checked if T1 set in step S85 is equal to or longer than Ta (step S87). If YES in step S87, the control waits for an elapse of time Ta (step S88); otherwise, the control waits for an elapse of time T1 (step S89). If time T1 or Ta has elapsed, the electronic shutter is "closed" (step S90) to capture a CCD image (step S91). Also, the mechanical shutter 12 is "opened" (step S92) to store that CCD image in the buffer memory 22 as a dark frame image corresponding to exposure time=T1 or Ta sec (step S93).

If a "full-stroke" operation of the shutter key is detected in step S94, the flow advances to step S95 in FIG. 18 to "open" the electronic shutter, and the control waits for an elapse of time T1. After an elapse of time T1, the mechanical shutter 12 and electronic shutter are "closed" (step S97). Subsequently, in step S98 a CCD image (DATA1) is captured, and is temporarily stored in the buffer memory 22.

After the mechanical shutter 12 is "opened", it is checked if time T1 is equal to or longer than Ta (step S100). If T1≧Ta in step S100, a correction value corresponding to exposure time T1 is read from the TBL (see FIG. 6) (step S101), and the pixel values of the dark frame data (DATA2) stored in step S93 are corrected using the correction value (step S102). The flow then advances to step S103. On the other hand, if T1<Ta in step S100, the flow jumps to step S103 while skipping the processes in steps S101 and S102.

In step S103, a correction process for removing noise components contained in DATA1 by subtracting DATA2 from DATA1 is executed. That is, in step S103 the same processes as those from step S38n in FIG. 11 to step S38w in FIG. 12 are executed.

DATA1 then undergoes a software gamma correction process (step S104) and a compression process by the compression/expansion circuit 23 (step S105). After that, DATA1 is recorded in the flash memory 24 (step S106), thus ending the program.

Note that the processes in steps S100 to S102 may be executed before a full-stroke operation of the shutter key (step S94), i.e., immediately after dark frame data is stored (step S93).

In this case, only exposure time T2 or both exposure time T2 and correction value may be controlled to change in correspondence with exposure time T1.

Also, in this case the user may arbitrarily set exposure time T1.

In the aforementioned embodiment, upon correcting DATA2, DATA2 stored in the buffer memory 22 is corrected in accordance with exposure time T1. Alternatively, the gamma correction characteristic for a CCD image before being stored in the buffer memory 22 may be changed by the gamma correction circuit 19 in accordance with exposure time T1 or the AGC gain of a CCD image before being stored in the buffer memory 22 may be increased by the CDS 17 in accordance with exposure time T1.

Figure 19A:
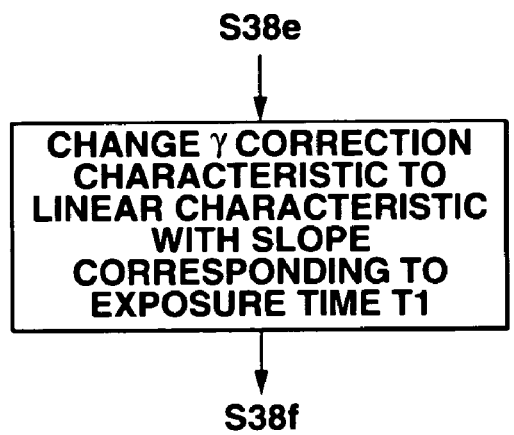
FIGS. 19A to 19C are flow charts showing the operation of still another control program of the image capture process for long-time exposure shown in FIG. 8.
Figure 19B:
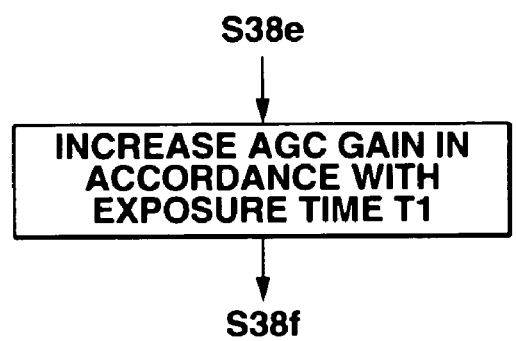
Figure 19C:
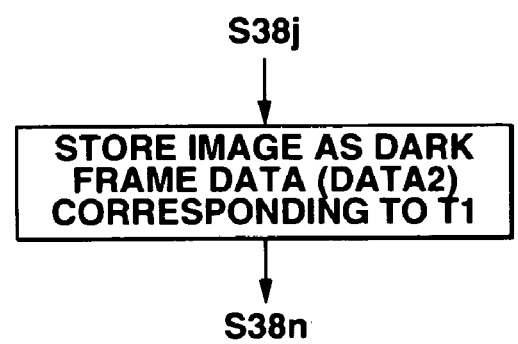

FIGS. 19A to 19C are flow charts of the image capture process program for long-time exposure used when DATA2 is corrected by changing the gamma correction characteristic (FIGS. 19A and 19C) and by adjusting the AGC gain (FIGS. 19B and 19C), and substantially the same processing steps as those in the aforementioned image capture processing program for long-time exposure (FIGS. 9 to 12) are executed except for the processing steps shown in FIGS. 19A to 19C.

More specifically, when DATA2 is corrected by changing the gamma correction characteristic, after a CCD image (DATA1) is captured in step S38e in FIG. 9, the flow advances to the processing step in FIG. 19A to change the slope of the gamma correction characteristic of the gamma correction circuit 19 in accordance with exposure time T1. The flow then returns to step S38f in FIG. 10 to "open" the electronic shutter.

After the electronic shutter is "opened" in step S38j in FIG. 10, the flow advances to the processing step in FIG. 19C to store a CCD image in the buffer memory 22 as a dark frame image corresponding to exposure time T1. The flow then returns to step S38n in FIG. 11.

Figure 11:
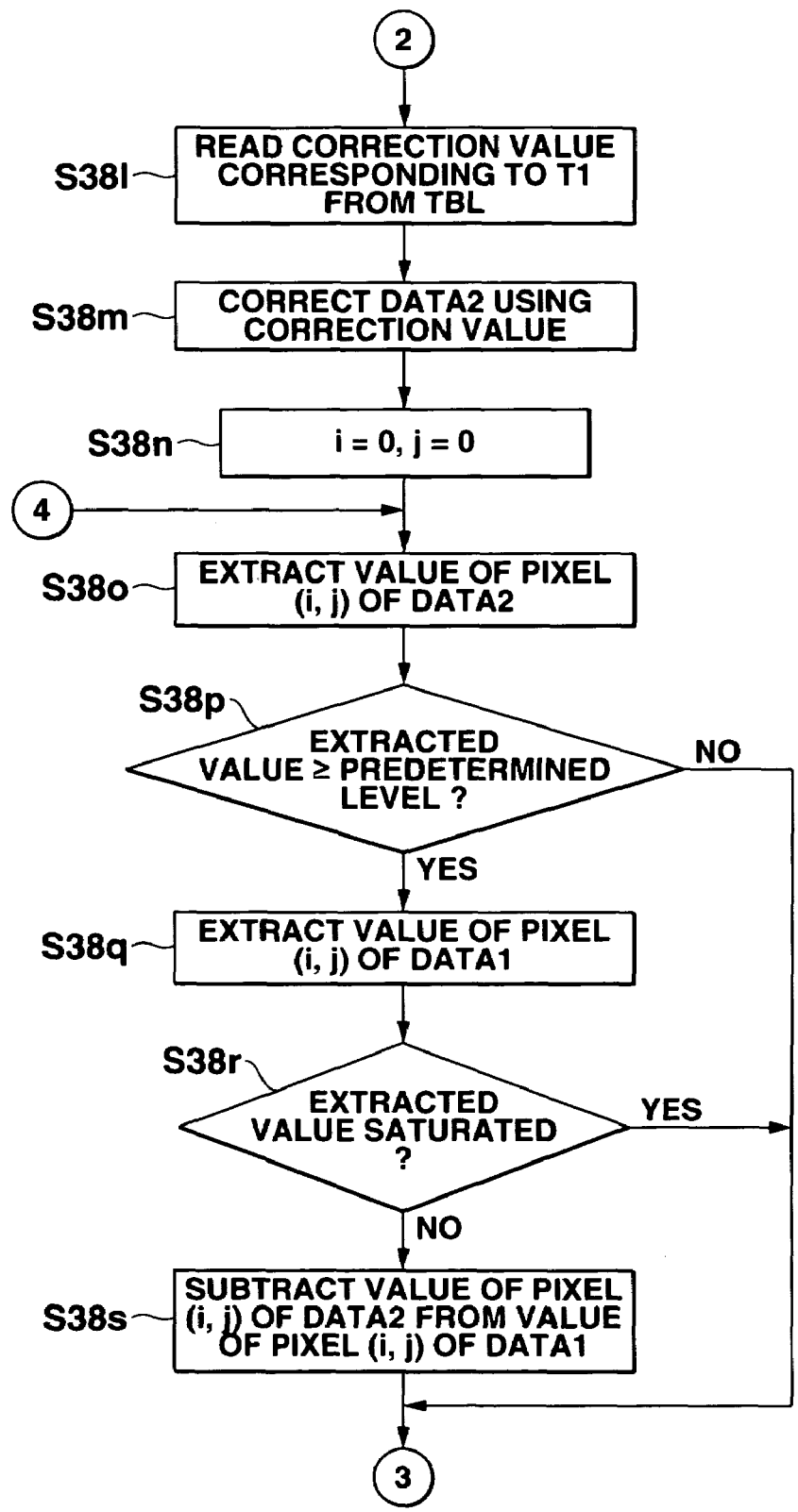
FIG. 11 is a flow chart (3/4) showing the operation of the control program of the image capture process for long-time exposure shown in FIG. 8.

That is, the processing step in FIG. 19A is inserted between step S38e in FIG. 10 and step S38f in FIG. 11, "Ta" in processing step S38k in FIG. 10 is changed to "T1", and processing steps S38l and S38m are omitted.

Likewise, when DATA2 is corrected by adjusting the AGC gain, after a CCD image (DATA1) is captured in step S38e in FIG. 9, the flow advances to the processing step in FIG. 19B to change the gain of an AGC gain adjustment circuit in the CDS 17 in accordance with exposure time T1. The flow then returns to step S38f in FIG. 10 to "open" the electronic shutter.

After the electronic shutter is "opened" in step S38j in FIG. 10, the flow advances to the processing step in FIG. 19C to store a CCD image in the buffer memory 22 as a dark frame image corresponding to exposure time T1. The flow then returns to step S38n in FIG. 11.

That is, the processing step in FIG. 19B is inserted between step S38e in FIG. 10 and step S38f in FIG. 11, "Ta" in processing step S38k in FIG. 10 is changed to "T1", and processing steps S38l and S38m are omitted.

In the aforementioned embodiment, when the camera user has pressed the shutter key to its full-stroke position to instruct image sensing, a sensed image (DATA1) and dark frame image (DATA2) are captured (sensed). However, when, for example, image sensing is automatically instructed like in timer image sensing at a fixed point, a sensed image (DATA1) and dark frame image (DATA2) may be captured (sensed).

In the aforementioned embodiment, after the camera user has pressed the shutter key to its full-stroke position to instruct image sensing, a sensed image (DATA1) is captured (sensed). However, other data, for example, sensed image data that has already been captured to display a through image immediately before image sensing is instructed may be used as DATA1.

In the aforementioned embodiment, as a correction process method for removing a dark output component included in DATA1, the CPU 25 subtracts DATA2 from DATA1 by software. However, the present invention is not limited to such specific process, but may use other correction process method, e.g., a process method for removing a dark output component by a hardware process using a subtraction circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic still camera comprising:

image sensing means for accumulating a charge corresponding to incoming light, converting the accumulated charge into image data, and outputting the image data;

optical path opening/closing means for opening/closing an incoming optical path to said image sensing means;

acquisition means for acquiring a first exposure time;

discrimination means for determining if the first exposure time is not less than a predetermined second exposure time;

image sensing instruction means for instructing image sensing;

first image sensing control means for, when image sensing is instructed by said image sensing instruction means, capturing first image data by exposing said image sensing means for the first exposure time with said optical path opening/closing means opened;

second image sensing control means for, when image sensing is instructed by said image sensing instruction means and when the discrimination means determines that the first exposure time is not less than the second exposure time, capturing second image data by exposing said image sensing means for the second exposure time not more than the first exposure time with said optical path opening/closing means closed;

first correction means for correcting the second image data captured by said second image sensing control means; and second correction means for correcting the first image data captured by said first image sensing control means using the second image data corrected by said first correction means.

2. A camera according to claim 1, further comprising:
a shutter switch,
wherein said image sensing instruction means instructs image sensing when said shutter switch is depressed.

3. A camera according to claim 1, further comprising:
measurement means for measuring a brightness of an object,
wherein said first exposure time corresponds to a measurement result of said measurement means.

4. A camera according to claim 1, further comprising:
setting means for setting an exposure time of user's choice,
wherein said first exposure time is set by said setting means.

5. A camera according to claim 1, wherein said second correction means corrects the first image data by subtracting the second image data corrected by said first correction means from the first image data.

6. A camera according to claim 1, wherein said first correction means corrects the second image data captured by said second image sensing control means in accordance with the first exposure time.

7. A camera according to claim 6, further comprising:
correction table storage means for storing a correction value in correspondence with an exposure time,
wherein said first correction means reads out a correction value corresponding to the first exposure time from said correction table storage means, and corrects the second image data using the readout correction value.

8. A camera according to claim 6, wherein said second exposure time is a fixed time.

9. A camera according to claim 1, wherein said second exposure time corresponds to the first exposure time.

10. A camera according to claim 9, wherein said first correction means corrects the second image data captured by said second image sensing control means using a fixed correction value.

11. A camera according to claim 1, wherein said second exposure time corresponds to the first exposure time with said optical path opening/closing means closed, and
said first correction means corrects the second image data captured by said second image sensing control means in accordance with the first exposure time.

12. A camera according to claim 1, further comprising:
fourth image sensing control means for, when said image sensing instruction means instructs image sensing, controlling said first image sensing control means to capture the first image data, and then controlling said second image sensing control means to capture the second image data.

13. A camera according to claim 1, further comprising:
image data storage means for storing the second image data captured by said second image sensing control means,
wherein said first correction means corrects the second image data stored in said image data storage means.

14. A camera according to claim 1, further comprising;
gamma correction means for making gamma correction of image data output from said image sensing means,
wherein said first correction means corrects the second image data by changing a gamma correction characteristic of said gamma correction means.

15. A camera according to claim 1, further comprising;
adjustment means for adjusting a signal level of image data output from said image sensing means,
wherein said first correction means corrects the second image data by changing a signal adjustment level of said adjustment means.

16. An electronic still camera comprising:
an image sensing element for accumulating a charge corresponding to incoming light, converting the accumulated charge into image data, and outputting the image data;
an optical path opening/closing member for opening/closing an incoming optical path to said image sensing element;
acquisition means for acquiring a first exposure time;
discrimination means for determining if the first exposure time is not less than a predetermined second exposure time;
an image sensing instruction member for instructing image sensing;
first image sensing control means for capturing first image data by exposing said image sensing element for the first exposure time with said optical path opening/closing member opened, upon depression of said image sensing instruction member;
second image sensing control means for capturing second image data by exposing said image sensing element for the second exposure time not more than the first exposure time with said optical path opening/closing member closed, upon depression of said image sensing instruction member, and when the discrimination means determines that the first exposure time is not less than the second exposure time;
first correction means for correcting the second image data captured by said second image sensing control means; and
second correction means for correcting the first image data captured by said first image sensing control means using the second image data corrected by said first correction means.

17. A signal processing method for an electronic still camera for removing a noise component in image data output from an image sensing element, said method comprising;
acquiring a first exposure time;
determining if the first exposure time is not less than a predetermined second exposure time;
capturing first image data by exposing the image sensing element for the first exposure time with an incoming optical path to the image sensing element opened, when image sensing is instructed;
capturing second image data by exposing the image sensing element for the second exposure time not more than the first exposure time with the incoming optical path to the image sensing element closed, when image sensing is instructed, and when it is determined that the first exposure time is not less than the second exposure time;
correcting the captured second image data; and
correcting the captured first image data using the corrected second image data.

18. An electronic still camera according to claim 1, further comprising:

third image sensing control means for, when image sensing is instructed by said image sensing instruction means and when the discrimination means determines that the first exposure time is less than the second exposure time, capturing third; image data by exposing said image sensing means for the first exposure time with said optical path opening/closing means closed; and third correction means for correcting said first image data captured by said first image sensing control means using the third image data captured by said third image sensing control means.

19. An electronic still camera comprising:

image sensing means for accumulating a charge corresponding to incoming lights converting the accumulated charge into image data and outputting the image data;

optical path opening/closing means for opening/closing an incoming optical path to said image sensing means;

acquisition means for acquiring a first exposure time;

discrimination means for determining if the first exposure time is not less than a predetermined second exposure time;

image sensing instruction means for instructing image sensing;

first image sensing control means for, when image sensing is instructed by said image sensing instruction means, capturing first image data by exposing said image sensing means for the first exposure time with said optical path opening/closing means opened;

second image sensing control means for, when image sensing is instructed by said image sensing instruction means and when the discrimination means determines that the first exposure time is not less than the second exposure time, capturing second image data by exposing said image sensing means for the second exposure time not more than the first exposure time with said optical path opening/closing means closed;

third image sensing control means for, when image sensing is instructed by said image sensing instruction means and when the discrimination means determines that the first exposure time is less than the second exposure time, capturing third image data by exposing said image sensing means for the first exposure time with said optical path opening/closing means closed;

first correction means for correcting the second image data captured by said second image sensing control means;

second correction means for correcting the first image data captured by said first image sensing control means using the second image data corrected by said first correction means; and third correction means for correcting the first image data captured by said first image sensing control means using the third image data captured by said third image sensing control means.

20. An electronic still camera according to claim 19, further comprising:

a shutter switch, wherein said image sensing instruction means instructs image sensing when said shutter switch is depressed.

21. An electronic still camera according to claim 19, further comprising:

measurement means for measuring brightness of an object, wherein said first exposure time corresponds to a measurement result of said measurement means.

22. An electronic still camera according to claim 19, wherein said second correction means corrects the first image data by subtracting the second image data corrected by said first correction means from the first image data; and wherein said third correction means corrects the first image data by subtracting the third image data captured by said third image sensing control means from the first image data.

23. An electronic still camera according to claim 19, wherein said first correction means corrects the second image data captured by said second image sensing control means in accordance with the first exposure time.

24. An electronic still camera according to claim 23, further comprising:

correction table storage means for storing a correction value in correspondence with an exposure time, wherein said first correction means reads out a correction value corresponding to the first exposure time from said correction table storage means, and corrects the second image data using the correction value.

25. An electronic still camera according to claim 23, wherein said second exposure time is fixed.

26. An electronic still camera according to claim 19, further comprising fourth image sensing control means for, when image sensing is instructed by said image sensing instruction means, controlling said first image sensing control means to capture the first image data, and then one of: (i) controlling said second image sensing control means to capture the second image data and (ii) controlling said third image sensing control means to capture the third image data.

27. An electronic still camera according to claim 19, further comprising:

image data storage means for storing the second image data captured by said second image sensing control means, wherein said first correction means corrects the second image data stored in said image data storage means.

28. An electronic still camera comprising:

an image sensing element which accumulates a charge corresponding to incoming light, converts the accumulated charge into image data and outputs the image data;

an optical path opening/closing member which opens/closes an incoming optical path to said image sensing element an acquisition unit which acquires a first exposure time;

a discrimination unit which determines if the first exposure time is not less than a predetermined second exposure time;

an image sensing instruction member which instructs image sensing;

first image sensing control means for, when said image sensing instruction member is depressed, capturing first image data by exposing said image sensing element for the first exposure time acquired by said acquisition unit with said optical path opening/closing member opened;

second image sensing control means for, when said image sensing instruction member is depressed and when the discrimination unit determines that the first exposure time is not less than the second exposure time, capturing second image data by exposing said image sensing element for the second exposure time not more than the first exposure time with said optical path opening/closing member closed;

third image sensing control means for, when said image sensing instruction member is depressed and when the discrimination unit determines that the first exposure time is less than the second exposure time, capturing third image data by exposing said image sensing element for the first exposure time with said optical path opening/closing member closed;

first correction means for correcting the second image data captured by said second image sensing control means;

second correction means for correcting the first image data captured by said first image sensing control means using the second image data corrected by said first correction means; and third correction means for correcting the first image data captured by said first image sensing control means using the third image data captured by said third image sensing control means.

29. A signal processing method for an electronic still camera for removing a noise component in image data output from an image sensing element, said method comprising:

acquiring a first exposure time;

determining if the acquired first exposure time is not less than a predetermined second exposure time;

capturing first image data by exposing said image sensing element for the first exposure time with an incoming optical path to the image sensing element opened, when image sensing is instructed;

capturing second image data by exposing said image sensing element for the second exposure time not more than the first exposure time with said incoming optical path closed, when image sensing is instructed and when it is determined that the first exposure time is not less than the second exposure time;

capturing third image data by exposing said image sensing element for the first exposure time with said incoming optical path to the image sensing element closed, when image sensing is instructed and when it is determined that the first exposure time is less than the second exposure time;

correcting the captured second image data;

correcting the captured first image data using the corrected second image data; and correcting the captured first image data using the captured third image data.

* * * * *